United States Patent
Cho

(10) Patent No.: US 9,891,822 B2
(45) Date of Patent: Feb. 13, 2018

(54) INPUT DEVICE AND METHOD FOR PROVIDING CHARACTER INPUT INTERFACE USING A CHARACTER SELECTION GESTURE UPON AN ARRANGEMENT OF A CENTRAL ITEM AND PERIPHERAL ITEMS

(71) Applicant: KOREA UNIVERSITY RESEARCH AND BUSINESS FOUNDATION, SEJONG CAMPUS, Sejong-si (KR)

(72) Inventor: Hyeon Joong Cho, Goyang-si (KR)

(73) Assignee: Korea University Research and Business Foundation, Sejong Campus, Sejong-si (KR)

( * ) Notice: Subject to any disclaimer, the term of this patent is extended or adjusted under 35 U.S.C. 154(b) by 416 days.

(21) Appl. No.: 14/506,951

(22) Filed: Oct. 6, 2014

(65) Prior Publication Data
US 2015/0040056 A1   Feb. 5, 2015

Related U.S. Application Data

(63) Continuation of application No. PCT/KR2013/002802, filed on Apr. 4, 2013.

(30) Foreign Application Priority Data

Apr. 6, 2012  (KR) .................. 10-2012-0035925

(51) Int. Cl.
*G06F 3/0488*   (2013.01)
*G06F 3/01*   (2006.01)
(Continued)

(52) U.S. Cl.
CPC .......... *G06F 3/04886* (2013.01); *G06F 3/017* (2013.01); *G06F 3/018* (2013.01);
(Continued)

(58) Field of Classification Search
CPC ...... G06F 3/04886; G06F 3/017; G06F 3/018; G06F 3/0236; G06F 3/0482;
(Continued)

(56) References Cited

U.S. PATENT DOCUMENTS

2007/0046641 A1* 3/2007 Lim .................... G06F 3/04886
                                                         345/173
2007/0256029 A1* 11/2007 Maxwell ............... G06F 3/0482
                                                         715/834
(Continued)

FOREIGN PATENT DOCUMENTS

KR   10-2010-0033879 A   3/2010
KR   10-2010-0049948 A   5/2010
(Continued)

OTHER PUBLICATIONS

International Search Report for PCT/KR2013/002802 dated Jun. 26, 2013.

*Primary Examiner* — Jennifer To
*Assistant Examiner* — Joseph R Burwell
(74) *Attorney, Agent, or Firm* — Typha IP LLC

(57) ABSTRACT

An input device is provided. The input device includes a display that displays a keypad for input of a character and a character input window showing a character string input through the keypad; a gesture sensor that senses a gesture of a user; and a controller that controls the display, based on the gesture, wherein the keypad comprises: a central item; a plurality of peripheral items arranged while being spaced from one another around the central item; and a plurality of guide lines corresponding to the plurality of the peripheral items, the plurality of the guide lines are in a straight or curved line form directed from each of the plurality of the peripheral items toward the central item, and have different forms and directions.

12 Claims, 17 Drawing Sheets

(51) Int. Cl.
*G06F 3/023* (2006.01)
*G06F 3/0482* (2013.01)
*G06F 3/0484* (2013.01)
*G06F 3/0486* (2013.01)
*G06F 3/0489* (2013.01)

(52) U.S. Cl.
CPC .......... *G06F 3/0236* (2013.01); *G06F 3/0482* (2013.01); *G06F 3/0486* (2013.01); *G06F 3/04842* (2013.01); *G06F 3/04883* (2013.01); *G06F 3/04897* (2013.01)

(58) Field of Classification Search
CPC ............... G06F 3/04842; G06F 3/0486; G06F 3/04882; G06F 3/04897
See application file for complete search history.

(56) References Cited

U.S. PATENT DOCUMENTS

| | | | | |
|---|---|---|---|---|
| 2009/0066656 | A1* | 3/2009 | Jung | ................... G06F 3/0416 345/171 |
| 2009/0282370 | A1* | 11/2009 | Rainwater | ........... G06F 3/04883 715/863 |
| 2010/0053104 | A1* | 3/2010 | Ahn | .................... G06F 3/04883 345/173 |
| 2011/0173573 | A1* | 7/2011 | Kim | ...................... G06F 3/0236 715/856 |
| 2011/0173575 | A1* | 7/2011 | Karafiat | ............. G06F 3/04883 715/863 |
| 2012/0206382 | A1* | 8/2012 | Kusano | ................ G06F 3/0236 345/173 |
| 2013/0033447 | A1* | 2/2013 | Cho | ....................... G06F 3/018 345/173 |
| 2014/0298237 | A1* | 10/2014 | Galu, Jr. | ............. G06F 3/04883 715/773 |

FOREIGN PATENT DOCUMENTS

| | | |
|---|---|---|
| KR | 10-2011-0077085 A | 7/2011 |
| KR | 10-2011-0080841 A | 7/2011 |
| KR | 10-2011-0115179 A | 10/2011 |
| WO | 2009/041420 A1 | 4/2009 |
| WO | WO 2011/096702 A2 * | 8/2011 ............. G06F 3/048 |

* cited by examiner

FIG. 16A
FIG. 16B
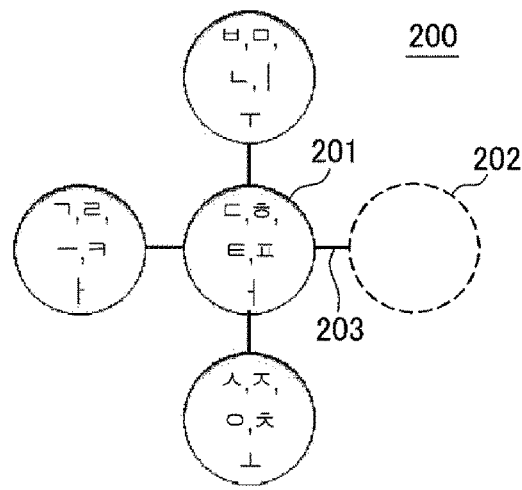
FIG. 16C
FIG. 16D
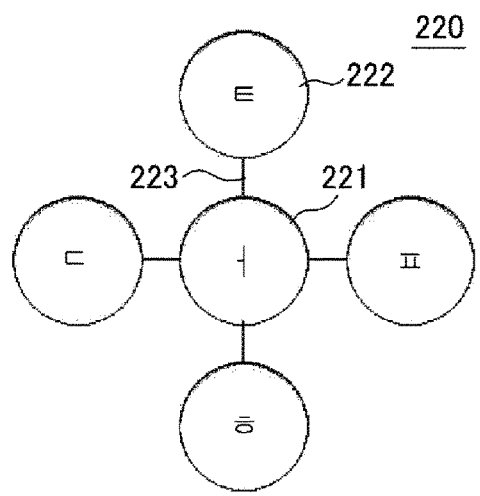

INPUT DEVICE AND METHOD FOR PROVIDING CHARACTER INPUT INTERFACE USING A CHARACTER SELECTION GESTURE UPON AN ARRANGEMENT OF A CENTRAL ITEM AND PERIPHERAL ITEMS

CROSS-REFERENCE TO RELATED APPLICATION

This Application is a continuation application of PCT Application No. PCT/KR2013/002802 filed on Apr. 4, 2013, which claims the benefit of Korean Patent Application No. 10-2012-0035925 filed on Apr. 6, 2012, the entire disclosures of which are incorporated herein by reference.

TECHNICAL FIELD

The embodiments described herein pertain generally to an input device for providing a character input interface and a method for inputting a character by using the input device.

BACKGROUND

Conventional input devices for providing a character input interface include a mouse, a key board, a keypad and so on, which include physical buttons. Among those devices, a keyboard includes a multiple number of buttons (which may be generally called "keys") corresponding to entire individual characters and a multiple number of functional keys, to input an individual character corresponding to a pressed button. Thus, different types of keyboards may be used according to different languages. For example, the QWERTY keyboard is commonly used to input English characters, and the two-set type keyboard is commonly used to input Korean characters.

Unlike the keyboard, a keypad includes a limited number of buttons. Generally, a keypad may have twenty (20) or less buttons, which include ten (10) numeral buttons corresponding to the numerals 0 to 9 and a multiple number of functional buttons corresponding to a multiple number of functions. In order to input characters by using the keypad, one or more individual characters should be allocated to one button. That is, a multiple number of buttons included in the keypad correspond to a multiple number of groups, into which whole individual characters are classified. Accordingly, when any one of the multiple number of the buttons is pressed at least once, the keypad inputs one of the one or more individual characters belonging to one of the groups, which corresponds to the pressed button, based on the number of times for pressing the button.

In this regard, Korean Patent Application Publication No. 10-2011-0115179 (Title of Invention: Character Inputting Device, Character Inputting Method, and Computer Readable Record Medium Recording a Character Inputting Program) describes a character inputting device, which includes an instructed position detector that detects an instructed position, a movement direction detector that detects a movement direction of the position to be detected, a group selection portion that selects one of a multiple number of character groups, into which a multiple number of characters are classified, based on the detected movement direction, and a character selection portion that selects one of one or more characters classified into the selected character group.

However, the character inputting device described in Korean Patent Application Publication No. 10-2011-0115179 provides a character input interface by using a keypad including twelve (12) buttons. Here, two (2) of the twelve (12) buttons are allocated for input of symbols, and the remaining ten (10) buttons are allocated for input of characters. Thus, since whole characters should be classified into ten (10) character groups corresponding to the ten (10) buttons, characters not related to one another may be classified into an identical character group, causing deteriorated intuition. Further, in inputting characters, it is necessary to repeatedly press a button corresponding to a character group, to which the character to be input belongs, until the character is activated, thus deteriorating the convenience.

Meanwhile, since conventional input devices are not easy to carry, they are usually used in the state of being fixed to a certain location. Accordingly, it is general that personal devices like a smart device are generally equipped with a touch screen, to provide a character input interface by using the touch screen, even without being connected to a conventional input device. Fixed terminals, like a smart TV or others, generally provide a character input interface by using a moving device such as a remote controller.

As to the method for providing a character input interface by using a touch screen, in the state that the touch screen displays virtual buttons corresponding to individual characters, symbols and so on, when a position at which a touching or scratching gesture is input is sensed, a character corresponding to a virtual button of the sensed position is input.

For example, if English characters are input by using a touch screen, the "QWERTY" keyboard, like a common keyboard for inputting English language, may be displayed on the touch screen. In this case, twenty-five (25) or more buttons corresponding to the twenty-five (25) English alphabet characters should be displayed on the touch screen having a limited width. Accordingly, since the size of each of the buttons is smaller than an area to be touched by a finger, errors may often occur unless particular attention is paid, and thereby, deteriorating the convenience.

Meanwhile, in order to select one of multiple items, a linear menu or a circular menu may be used.

FIG. 1A shows an example for a linear menu, and FIG. 1B shows an example for a circular menu. In FIG. 1A and FIG. 1B, the linear menu and the circular menu display eight (8) items, which include "Login," "Logout," "Open," "Close," "Hardcopy," "Shrink," "Shape," and "Move."

As illustrated in FIG. 1A, the linear menu arranges the multiple items in the vertical direction. When a gesture is input such that one of the multiple items is activated, the activated item is selected. Since the linear menu enumerates multiple items in one direction, it is advantageous in that the number of items that can be arranged in the linear menu is not limited.

As illustrated in FIG. 1B, the circular menu divides an entire area into multiple divided areas based on the center point of the entire area, and arranges multiple items in the multiple divided areas. When a gesture to one of the multiple divided areas occurs, an item corresponding to the divided area, at which the gesture has occurred, is selected.

In order to select any one of the items through the circular menu, an accurate gesture to the divided area of an item desired to be selected should be input, and thus, each of the divided areas needs to have a width sufficient enough to assure the accurate gesture. For example, it is known that if a central angle of each of the divided areas is 45° or smaller, namely, the number of the divided areas exceeds eight (8), the accuracy of a gesture is significantly lowered. Accordingly, the number of the divided areas is limited, and as a result, the number of items, which can be arranged in the circular menu, is limited. Therefore, the circular menu is disadvantageous in that the number of items that can be selected through the circular menu is limited to eight (8) or less.

SUMMARY

In view of the foregoing, example embodiments provide an input device and a method for inputting a character by using the input device, which can provide a character input interface having improved intuition and convenience, by using a virtual keypad in a circular menu form modified such that the number of items, which can be arranged, does not need to be limited according to a width of each of areas where the items are arranged.

In one example embodiment, an input device for providing a character input interface, comprising: a display that displays a keypad for input of a character and a character input window showing a character string input through the keypad; a gesture sensor that senses a gesture of a user; and a controller that controls the display, based on the gesture.

Here, the keypad comprises: a central item; a plurality of peripheral items arranged while being spaced from one another around the central item; and a plurality of guide lines corresponding to the plurality of the peripheral items, the plurality of the guide lines are in a straight or curved line form directed from each of the plurality of the peripheral items toward the central item, and have different forms and directions.

In addition, when a character selection gesture for selecting any one item of the keypad is input through the gesture sensor, the display inserts an individual character allocated to the item selected by the character selection gesture.

In addition, in one example embodiment, a method for inputting a character by using an input device for providing a character input interface, comprising: displaying a keypad for inputting a character into a character input window showing an input character string; sensing a character selection gesture for selecting any one item of the keypad; and inserting an individual character allocated to an item selected by the character selection gesture into a character string of the character input window.

In another example embodiment, a device for inputting a character, comprising: a gesture sensor that senses a user's gesture to a keypad of a character input interface displayed in a display device; and a controller that generates a control signal for controlling the display device based on the gesture to transmit the control signal to the display device.

Here, the keypad comprises a central item, a plurality of peripheral items arranged while being spaced from one another around the central item, the central item is displayed at a position overlapping with a cursor displayed in a character input window of the character input interface, and when a character selection gesture for selecting any one of the central item and the plurality of the peripheral items is input, the controller generates a control signal corresponding to the selected item.

In accordance with the example embodiments, the input device and the method for inputting a character by using the input device input a character, by using a keypad in a circular menu form modified to arrange items in excess of eight (8) in number therein. Here, the keypad includes a central item, a multiple number of peripheral items arranged while being spaced from one another around the central item, and a multiple number of guide lines corresponding to the multiple number of the peripheral items, wherein at least parts of the central item and the multiple number of the peripheral items display one or more items, and the multiple number of the guide lines have different forms or directions.

Accordingly, since the multiple number of the guide lines can be identified with their forms and directions, the multiple number of the peripheral items corresponding to the multiple number of the guide lines can also be identified by the multiple number of the guide lines. Thus, through a drag gesture based on one of the multiple number of the guide lines that correspond to a peripheral item to be selected, an item allocated to one of the multiple number of the peripheral items can be selected.

That is, since gestures for selecting items allocated to the multiple number of the peripheral items do not correspond to the peripheral items, but correspond to the guide lines, there is no necessity to restrict the multiple number of the peripheral items to a threshold width. Furthermore, the number of the peripheral items and the number of items that can be allocated to the peripheral items are not limited to eight (8) or less. Therefore, the keypad can be easily applied to various foreign languages, and the utilization thereof can be extended.

Further, since gestures for dragging items allocated to the multiple number of the peripheral items to the central item can be intuited by a user, the convenience and the intuition can be improved.

Still further, deterioration of the intuition and the convenience resulting from displaying too many individual characters in one keypad can be prevented, by inputting individual characters through processes for classifying individual characters of each language into a multiple number of groups, selecting one of the multiple number of the groups, and then, selecting one of one or more individual characters included in the selected group.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 15A, 15B, 15C, 15D, 15E, 15F, 15G, 16A, 16B, 16C, 16D, 17A, 17B, 17C, 17D, 17E, 17F and FIG. 17G show examples of processes for inputting ㄱ ', 'ㅏ' and 'ㄲ' of the Korean characters, respectively, by using the main keypad of FIG. 14A and FIG. 14B.

DETAILED DESCRIPTION

Figure 1A:
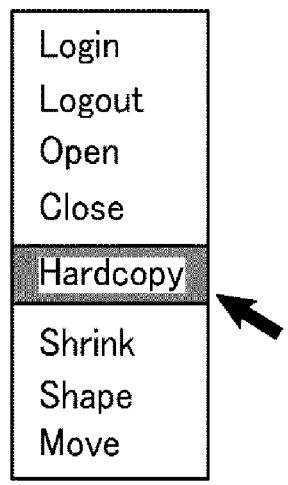
FIG. 1A shows an example of a linear menu.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

Figure 2:
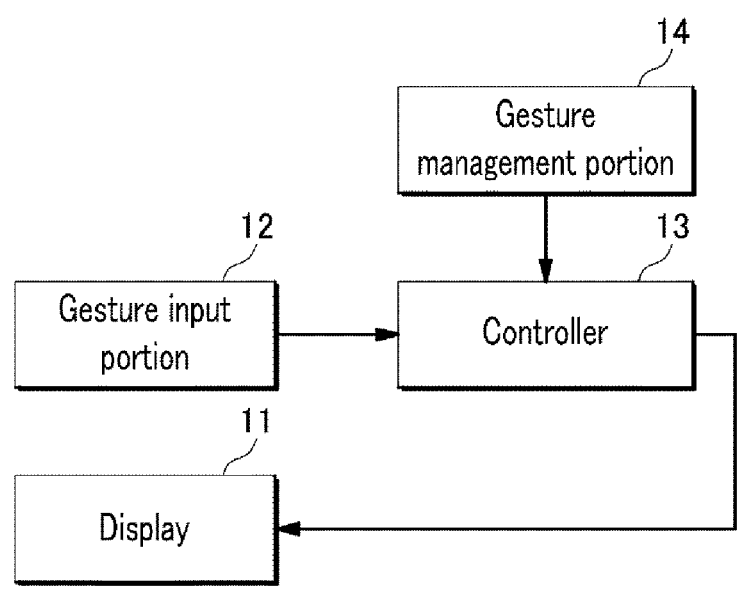
FIG. 2 is a block diagram showing an input device in accordance with an example embodiment.
Figure 3:
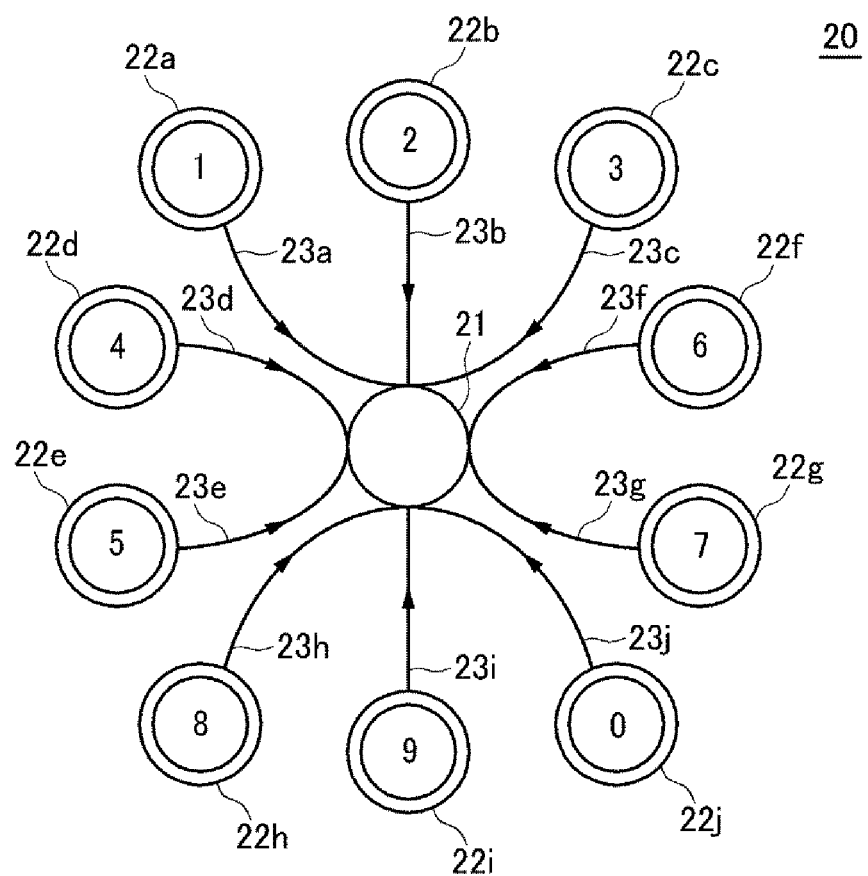
FIG. 3 shows an example for a virtual keypad in accordance with an example embodiment.
Figure 4A:
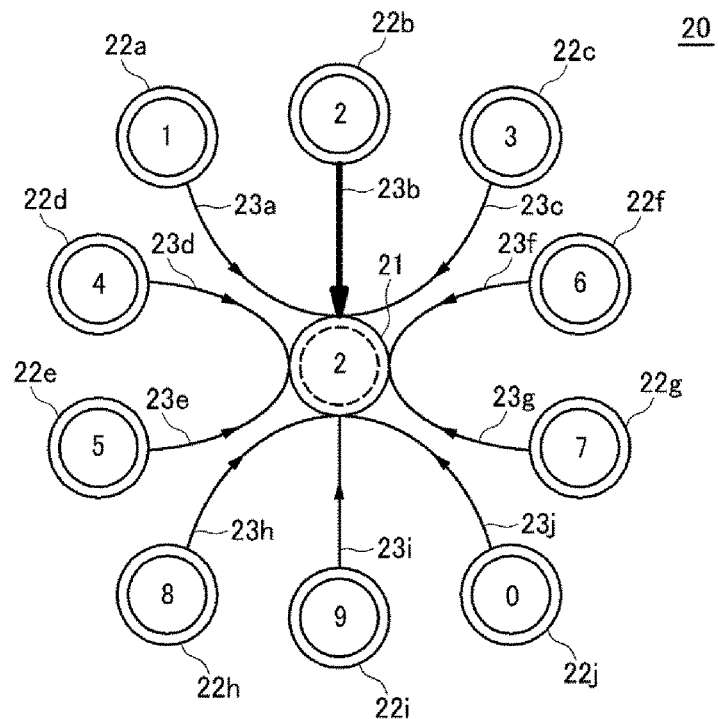
FIG. 4A and FIG. 4B show examples of a gesture for selecting one of multiple items by using the keypad of FIG. 3.
Figure 4B:
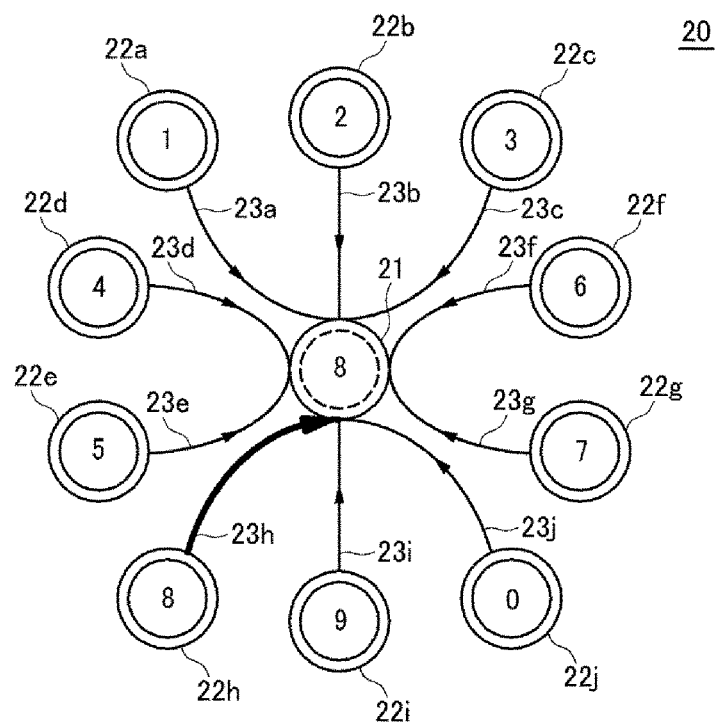

Hereinafter, the input device in accordance with an example embodiment will be described with reference to FIG. 2, FIG. 3 and FIG. 4A to FIG. 4C. FIG. 2 is a block diagram showing the input device in accordance with an example embodiment. FIG. 3 shows an example of a virtual keypad in accordance with an example embodiment. FIG. 4A to FIG. 4C show examples of a gesture for selecting one of a multiple number of items by using the keypad of FIG. 3.

As illustrated in FIG. 2, the input device 10 in accordance with an example embodiment includes a display 11, a gesture sensor 12, a controller 13 and a gesture management portion 14.

The display 11 displays visual information. Such a display 11 displays a window, icons, a menu, a pointer and so on, and especially, may display at least one of a character input window that shows an input character string, a gesture input window that shows a gesture input from a user, and a keypad menu (hereinafter, referred-to as a "keypad") that shows a list of characters for input of characters.

The gesture sensor 12 senses a user's gesture. In this case, the user's gesture may include at least one of a click gesture for selecting or activating an object, and a drag gesture for moving an object.

For example, the gesture sensor 12 may include at least one of a touch screen that senses a position touched by a user's gesture, a camera that photographs a user's gesture or posture to generate an image signal, a motion sensor that senses an infrared ray to be reflected to output a sensor signal corresponding to a user's gesture or posture, and a current measuring device that measures currents of the user's hand. Additionally, the gesture sensor 12 may include any one of a pointing device based on a graphic interface, i.e., a joystick, a light pen, a mouse, a touch pad and a trackball.

If the gesture sensor 12 includes a touch screen (not illustrated), it may receive input of touching, scratching and detaching by a finger or a touch pen onto the touch screen. In this case, touching by shortly pressing a position corresponding to a certain object on the touch screen may match a click gesture. Scratching by pressing a position corresponding to a certain object on the touch screen, and in this state, moving the position toward another position may match a drag or drag and drop gesture. Here, the drag and drop gesture is a gesture for moving a certain object from a first position toward a second position. Touching for pressing a position corresponding to a certain object on the touch screen for a long time or double touching for shortly pressing the position twice may match a double click gesture for executing the object. Detaching a position corresponding to a certain object on the touch screen may match a click gesture.

If the gesture sensor 12 includes a camera, it may receive input of an image signal that can be interpreted as various gestures. If the gesture sensor 12 includes a current measuring device, it may receive input of a current value measurement signal that can be interpreted as various gestures based on current values of the hand depending on types of a user's gestures. If the gesture sensor 12 includes a motion sensor, it may receive input of a sensor signal that can be interpreted as various gestures.

The controller 13 generates a control signal for controlling the display 11, based on a user's gesture input through the gesture sensor 12, and sends the generated control signal to the display 11.

For example, in the state that the display 11 displays a character input window, when a user's touching gesture to the character input window on the touch screen is input through the gesture sensor 12, the controller 13 may generate a control signal for activating a cursor indicating a position. A character string is inserted into the position, in the character input window, based on the touching gesture matching the click gesture for selecting the character input window. In addition, the controller 13 may control the display 11, by sending the generated signal to the display 11.

The gesture management portion 14 retains signals that can be input through the gesture sensor 12 and gestures that match the respective signals that can be input. Accordingly, the controller 11 may search the gesture management portion 14 to derive a gesture, which matches a signal input through the gesture sensor 12.

Although not specifically illustrated in FIG. 2, the display 11 and the gesture sensor 12 of the input device 10 may be contained in different housings. The controller 13 and the gesture management portion 14 may be contained together in the housing containing either the display 11 or the gesture sensor 12. If the controller 13 and the display 11 are not contained in an identical housing, a signal transmission and reception unit (not illustrated) for transmitting and receiving a control signal between the controller 13 and the display 11 may be further provided.

For example, the input device 10 in accordance with an example embodiment may be applied to a smart phone, of which the display 11, like a touch screen, and the gesture sensor 12 are integrated with each other, or others. In addition, the input device 10 may be configured to be in the form that the gesture sensor 12 is combined with a device like a remote controller controlling the display 11 in the state of being separated from the display 11.

Meanwhile, the input device 10 in accordance with an example embodiment displays a virtual keypad when a keypad request gesture is input from a user. Here, the keypad request gesture may include a click gesture to the character input window.

As illustrated in FIG. 3, the virtual keypad 20 in accordance with an example embodiment has a circular menu form modified to arrange items in excess of eight (8) in number.

A common circular menu divides an entire area into a multiple number of areas based on the center point of the entire area, and arranges multiple different items in the multiple number of the divided areas. When a gesture for selecting one of the multiple number of the divided areas is input, an item arranged in the selected divided area is selected. Thus, for input of a gesture with a certain level of or higher accuracy, the multiple number of the divided areas are often limited by a threshold. For example, it is generally understood that eight (8) or fewer items can be arranged in the circular menu.

In contrast, the keypad 20 of FIG. 3 includes one central item 21, a multiple number of peripheral items 22a to 22j, and a multiple number of guide lines corresponding to the multiple number of the peripheral items 22a to 22j, in which one or more different items are arranged. A multiple number of items arranged in the keypad 20 of FIG. 3 may be numerals or characters, but not be limited thereto.

The multiple number of the peripheral items 22a to 22j are arranged while being spaced from one another to surround the periphery of the central item 21. One or more different items may be allocated to the multiple number of the peripheral items 22a to 22j.

The central item 21 is located at the center of the keypad 20, and may be allocated for an initial value of a blank (which may be referred-to as a "default") or an initial value selected for any one of one or more items. That is, before a gesture for selecting one of the multiple number of the peripheral items 22a to 22j is input, the central item 21 may be a blank in which no item is arranged, or an item in which an item representing one or more items is arranged. Thus, at least parts of the central item 21 and the multiple number of the peripheral items 22a to 22j are allocated for one or more different items.

The multiple number of the guide lines 23a to 23j are paths in a straight or curved line shape directed from each of the multiple number of the peripheral items 22a to 22j toward the central item 21. In this case, the multiple number of the guide lines 23a to 23j can be identified as they have different forms or directions, and the multiple number of the peripheral items 22a to 22j can also be identified as they correspond to the multiple number of the guide lines 23a to 23j.

In the state that the keypad 20 is displayed, a gesture for selecting one item of the central item 21 and the multiple number of the peripheral items 22a to 22j, i.e., a gesture for selecting an item arranged in any one of the central item 21 and the multiple number of the peripheral items 22a to 22j is input. In this case, the gesture for selecting an item includes a drag gesture based on one of the multiple number of the guide lines 23a to 23j, which corresponds to a peripheral area to be selected, or a click gesture corresponding to the central item 21.

That is, if a user intends to select an item arranged in the central item 21, he and/or she may input a click gesture to the central item. Or, if a user intends to select an item arranged in any one of the multiple number of the peripheral items 22a to 22j, he and/or she may input a drag gesture based on a guide line corresponding to a peripheral area, in which the item to be selected is arranged. In this case, when the drag gesture is input, a motion showing that the item selected by the gesture moves from the peripheral item toward the central item along the guide line like the drag gesture to be rearranged at the central item may be displayed.

For example, the keypad 20 may include the central item 21 having an initial value of a blank, and the multiple number of the peripheral items 22a to 22j displaying the numerals "0" to "9." That is, the first, second and third peripheral items 22a, 22b and 22c arranged in the upper side of the central item 21 display the numerals "1," "2," and "3," respectively, and the fourth and fifth peripheral items 22d and 22e arranged in the left side of the central item 21 display the numerals "4" and "5," respectively. The sixth and seventh peripheral items 22f and 22g arranged in the right side of the central item 21 display the numerals "6" and "7," respectively, and the eighth, ninth, and tenth peripheral items 22h, 22i and 22j arranged in the lower side of the central item 21 display the numerals "8," "9" and "0," respectively.

The first guide line 23a connecting the first peripheral area 22a and the central item 21 is in a curved line form directed from the upper left side toward the lower right side in the counterclockwise direction. The second guide line 23b connecting the second peripheral area 22b and the central item 21 is in a straight line form directed from the upper side toward the lower side. The third guide line 23c connecting the third peripheral area 22c and the central item 21 is in a curved line form directed from the upper right side toward the lower left side in the clockwise direction. The fourth guide line 23d is in a curved line form directed from the upper left side toward the lower right side, and the fifth guide line 23e is in a curved line form directed from the lower left side toward the upper right side in the counterclockwise direction. The sixth guideline 23f is in a curved line form directed from the upper right side toward the lower left side in the counterclockwise direction. The seventh guide line 23g is in a curved line form directed from the lower right side toward the upper left side in the clockwise direction. The eighth guide line 23h is in a curved line form directed from the lower left side toward the upper right side in the clockwise direction. The ninth guide line 23i is in a straight line form directed from the lower side toward the upper side. The tenth guide line 23j is in a curved line form directed from the lower right side toward the upper left side in the counterclockwise direction.

As described above, since the multiple number of the guide lines 23a to 23j have different forms and directions, they can be identified with their forms and directions. The multiple number of the peripheral items 22a to 22j, which correspond to the multiple number of the guide lines 23a to 23j, can also be identified by the multiple number of the guide lines 23a to 23j. Accordingly, through a drag gesture based on the multiple number of the guide lines 23a to 23j, one of one or more items arranged in the multiple number of the peripheral items 22a to 22j can be selected.

That is, in the state that the keypad 20 is displayed, when a drag gesture for selecting one of one or more items arranged in the multiple number of the peripheral items 22*a* to 22*j* is input, the input device 10 may recognize an item selected by the gesture, by deriving one of the multiple number of the guide lines 23*a* to 23*j*, which matches the form and the direction of the drag gesture, deriving a peripheral item corresponding to the derived guide line, and deriving an item allocated to the derived peripheral item.

For example, as indicated by the bold arrow in FIG. 4A, if a user intends to select the numeral "2" from the items arranged in the multiple number of the peripheral items 22*a* to 22*j* by using the keypad 20 of FIG. 3, he and/or she can easily input a drag gesture in a straight line form directed from the upper side toward the lower side, by using the second guide line 23*b* corresponding to the second peripheral item 22*b* indicating the numeral "2."

With respect to another example, as indicated by the bold arrow in FIG. 4B, if a user intends to input the numeral "8" among the items arranged in the multiple number of the peripheral items 22*a* to 22*j* by using the keypad 20 of FIG. 3, he and/or she can easily input a drag gesture in a curved line form directed from the lower left side toward the upper right side in the clockwise direction, by using the eighth guide line 23*h* corresponding to the eighth peripheral item 22*h* indicating the numeral "8."

Like this, when a drag gesture for selecting one of the items arranged in the multiple number of the peripheral items 22*a* to 22*j* is input through the gesture sensor 12, the display 11 may display a motion to move the selected item from the peripheral area toward the central item 21 along the guide line.

Meanwhile, an item arranged in the central item 21, as well as the multiple number of the peripheral items 22*a* to 22*j*, may be selected. That is, in the state that the keypad 20 is displayed, when a click gesture corresponding to the central item 21 is input, the input device 10 may recognize an item arranged in the central item 21 as an item selected by the gesture.

For example, if the gesture sensor 12 includes a touch screen, the click gesture may match detaching to the central item 21 on the touch screen.

If a click gesture to the central item 21 is input in the state that the central item 21 displays an initial value of a blank, the input device 10 may insert a space into a character string of the character input window.

As described above, the keypad 20 of FIG. 3 is in a modified circular menu form and includes the central item 21, in which at least one item including a blank is arranged, the multiple number of the peripheral items 22*a* to 22*j*, and the multiple number of the guide lines 23*a* to 23*j*, which correspond to the multiple number of the peripheral items 22*a* to 22*j* and have different forms and directions.

Since the multiple number of the guide lines 23*a* to 23*j* may be displayed to guide gestures for selecting items, a gesture for dragging and dropping an item arranged in the peripheral items to the central item may be intuited by a user. Accordingly, if a character input interface is provided by using the keypad 20 of FIG. 3, the convenience and the intuition of the input device 10 can be improved.

Further, unlike a common circular menu, one or more items arranged in the multiple number of the peripheral items 22*a* to 22*j* are identified with the multiple number of the guide lines 23*a* to 23*j* corresponding to the multiple number of the peripheral items 22*a* to 22*j*, and not the multiple number of the peripheral items 22*a* to 22*j*. Thus, since there does not need to be a threshold for the multiple number of the peripheral items 22*a* to 22*j* in order to assure accuracy of a gesture for selecting one item, the multiple number of the peripheral items 22*a* to 22*j* do not need to be limited to eight (8) or less if the peripheral items 22*a* to 22*j* correspond to their unique guide lines. That is, since the keypad 20 of FIG. 3 does not limit the number of items that can be displayed through the keypad 20 to eight (8) or less, it may have extended utilization, compared to a common circular menu.

Next, a method for inputting a character by using the input device 10 illustrated in FIG. 2 is described with reference to FIG. 5 to FIG. 7.

Figure 5:
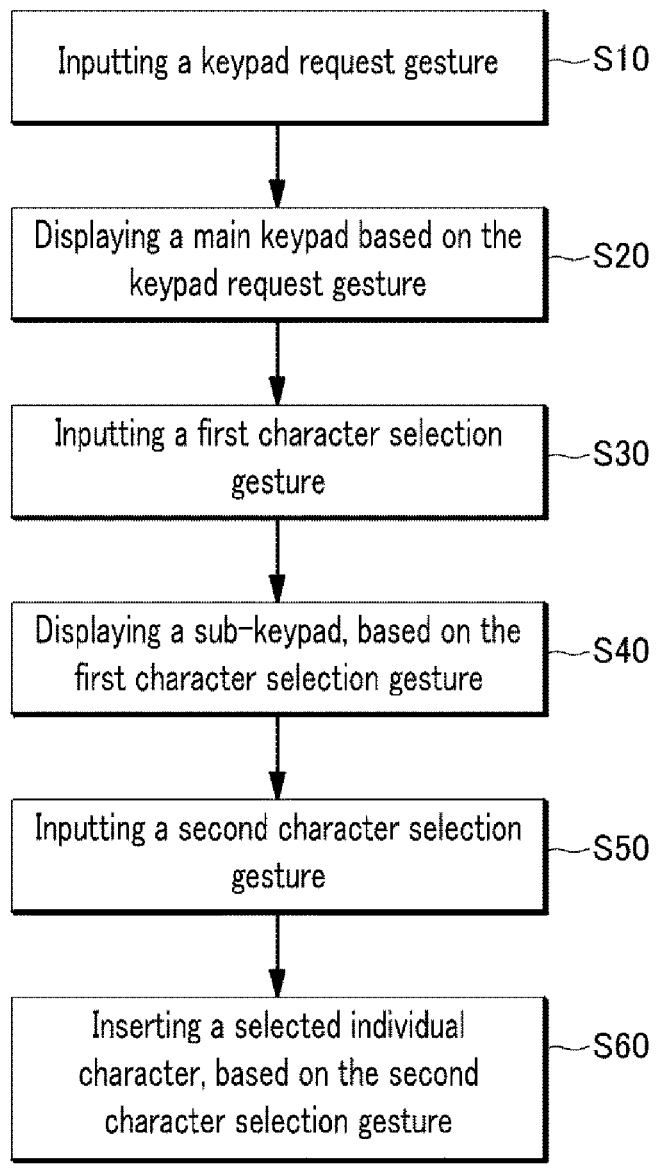
FIG. 5 is a flow chart showing a method for inputting a character in accordance with an example embodiment.
Figure 6:
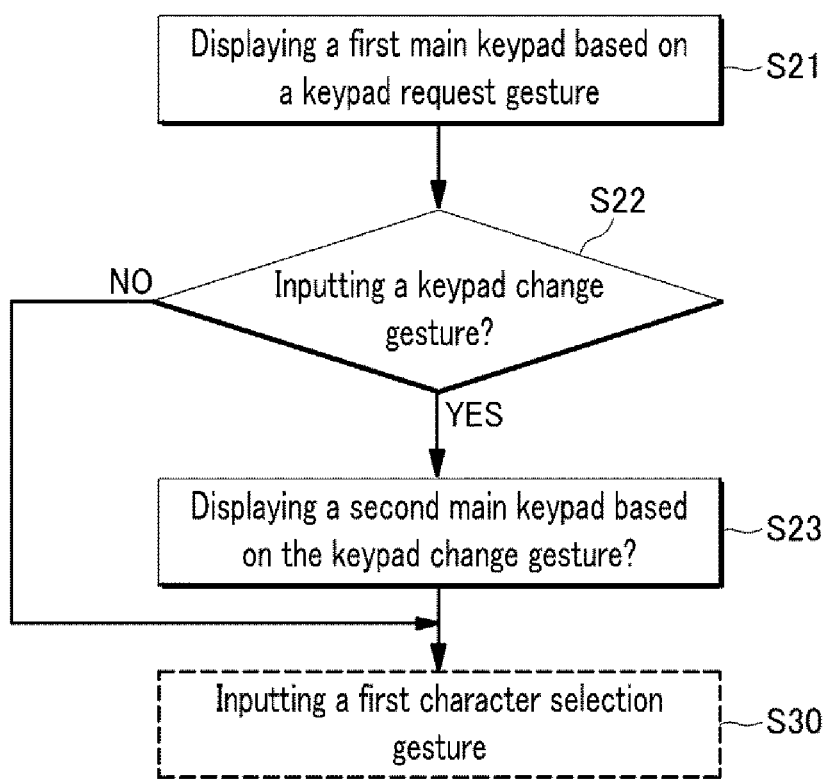
FIG. 6 is a flow chart showing steps for displaying a main keypad of FIG. 5.
Figure 7:
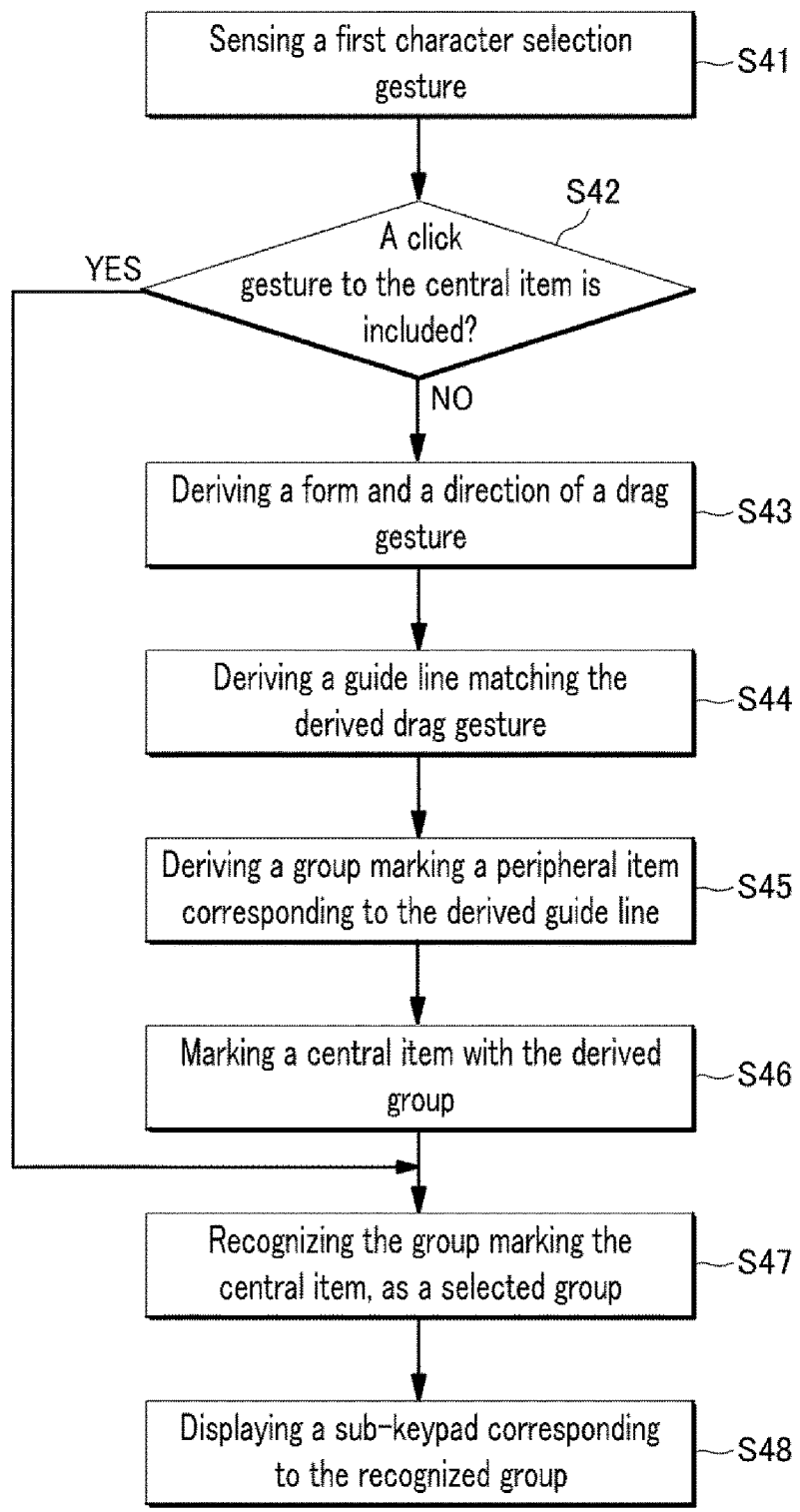
FIG. 7 is a flow chart showing steps for displaying a sub-keypad of FIG. 5.

FIG. 5 is a flow chart showing a method for inputting a character in accordance with an example embodiment, FIG. 6 is a flow chart showing steps for displaying a main keypad of FIG. 5, and FIG. 7 is a flow chart showing steps for sensing a first character selection gesture of FIG. 5.

The method for inputting a character in accordance with an example embodiment selects a character to be input by using the keypad 20 of FIG. 3. That is, the method for inputting a character includes sensing a keypad request gesture for requesting display of a keypad to input a character into the character input window, displaying a keypad for input of a character based on the keypad request gesture, sensing the character selection gesture for selecting one item from the keypad, and inserting an individual character allocated to the item selected by the character selection gesture into a character string of the character input window.

However, in the case where one keypad 20 displays whole individual characters, it should include as many peripheral items as the number of the whole individual characters, so that the intuition and the convenience of the keypad 20 may not be deteriorated.

In order to prevent this problem, whole individual characters for marking each language are classified into a multiple number of groups according to relationship in terms of forms, pronounciation and sequences of the characters. In this case, the multiple number of the groups include one or more individual characters. According to languages, one of the one or more individual characters included in each of the groups may be designated as a representative character representing the group. That is, any one group may indicate two (2) or more individual characters including a representative character, and another group may indicate only a representative character.

Thus, the method for inputting a character in accordance with an example embodiment includes a first selection process for selecting one of a multiple number of groups, and a second selection process for selecting one of one or more individual characters included in the group selected through the first selection process.

That is, as illustrated in FIG. 5, the method for inputting a character in accordance with an example embodiment includes sensing a keypad request gesture for requesting display of a keypad (S10), displaying a main keypad for selecting one of a multiple number of groups, into which whole individual characters are classified (S20), sensing a first character selection gesture for selecting one of the multiple number of the groups displayed in the main keypad (S30), displaying a sub-keypad for selecting one of one or more individual characters included in the selected group, based on the first character selection gesture (S40), sensing a second character selection gesture for selecting one of one or more individual characters displayed by the sub-keypad (S50), and inserting the selected individual character into a character string of the character input window, based on the second character selection gesture.

In sensing the keypad request gesture (S10), the input device 10 senses the keypad request gesture input through the gesture sensor 12. In this case, the keypad request gesture may include a clock gesture to the character input window. For example, if the gesture sensor 12 includes a touch screen, the keypad request gesture may match shortly touching a position corresponding to the character input window on the display 11 through the touch screen of the gesture sensor 12.

In displaying a main keypad (S20), the input device 10 displays a main keypad indicating a list of the multiple number of the groups. Here, like the keypad 20 of FIG. 3, the main keypad includes a central item, a multiple number of peripheral items arranged while being spaced from one another around the central item, and a multiple number of guide lines corresponding to the multiple number of the peripheral items.

In the main keypad, the multiple number of the peripheral items may display at least one of the multiple number of the groups. In this case, parts of the multiple number of the peripheral items may be allocated to one or more different groups, and the other parts may be blank. Or, all the multiple number of the peripheral items may display a multiple number of different groups, or be blank.

The central item may be allocated for an initial value of a blank, or an initial value selected for any one of the multiple number of the groups. For example, assuming that the main keypad includes three (3) peripheral items, and whole individual characters are classified into Groups A, B and C, an initial value selected for Group A may be arranged at the central item, Groups B and C are arranged at two (2) of the three (3) peripheral items, and the other one (1) peripheral item may be blank. Or, an initial value of a blank may be arranged at the central item, and Groups A, B and C may be differently arranged at the three (3) peripheral items.

In this case, the central item and the multiple number of the peripheral items may display a multiple number of representative characters representing the respective groups, instead of the multiple number of the groups. The multiple number of the guide lines are paths in a straight or curved line form directed from each of the multiple number of the peripheral items toward the central item, and have different directions or forms. Such a main keypad is described in more detail by using the embodiments illustrated in FIG. 8 to FIG. 17G.

The main keypad may be two (2) or more in number, depending on languages. For example, in case of Korean characters, since consonants may be classified into single consonants and double consonants, the main keypad may include a first main keypad for the single consonants and a second main keypad for the double consonants.

As illustrated in FIG. 6, if the main keypad is two (2) or more in number, the displaying of a main keypad (S20) includes displaying a first main keypad based on a keypad request gesture (S21), and displaying a second main keypad (S23), which is different from the first main keypad, based on a keypad change gesture, when the request change gesture is sensed (S22).

That is, in the state that the first main keypad is displayed (S21), the input device 10 senses a first character selection gesture for selecting one of the groups displayed in the first main keypad in S30. On the other hand, in the state that the second main keypad is displayed based on a keypad change gesture (S23), the input device 10 senses a first character selection gesture for selecting one of the other groups displayed in the second main keypad in S30.

For example, the keypad change gesture may include a click or double click gesture to the character input window or the first main keypad. For example, in the state that the character input window is displayed, when a user double-clicks an area corresponding to the character input window, the input device 10 may recognize that a keypad request gesture and a keypad change gesture are input at one time, and display the second main keypad. As another example, in the state that the first main keypad is displayed, when a user double-clicks an area corresponding to the character input window or the central item of the first main keypad, or any certain area of a touch input window, the input device 10 may recognize that a keypad change gesture is input, and display the second main keypad. Here, the touch input window receives input of an area touched by a user, i.e., a touch gesture, and displays the input gesture.

Next, in the sensing of a first character selection gesture as illustrated in FIG. 5 (S30), in the state that the main keypad is displayed, the input device 10 senses a first character selection gesture for selecting any one of items of the main keypad. One of the multiple number of the groups arranged in the main keypad is selected, by the first character selection gesture.

The first character selection gesture includes a drag gesture based on a guide line, which corresponds to a peripheral item to be selected, among the multiple number of the guide lines included in the main keypad, or a click gesture corresponding to the central item. That is, the first character selection gesture for selecting one of the one or more groups arranged in the multiple number of the peripheral items of the main keypad includes a drag gesture matching a form and a direction of a guide line corresponding to a peripheral item, in which a group to be selected is arranged. Or, the first character selection gesture for selecting a group arranged in the central item of the main keypad includes a clock gesture to the central item. For example, if the gesture sensor 12 includes a touch screen, when a user detaches the touch screen while placing a pointer at the central item of the touch screen, namely, detaches the central item, the input device 10 may recognize that the first character selection gesture including a click gesture to the central item is input.

In the displaying of a sub-keypad as illustrated in FIG. 5 (S40), the input device 10 recognizes a group selected by the first character selection gesture, and displays a sub-keypad for selecting any one of one or more individual characters included in the selected group in response to the selected group.

That is, as illustrated in FIG. 7, the displaying of a sub-keypad (S40) includes: receiving input of a first character selection gesture (S41); deriving a form and a direction of a drag gesture included in the first character selection gesture (S43) if the first character selection gesture does not include a click gesture to the central item (S42); deriving a guide line, which matches the derived form and direction of the drag gesture, from the multiple number of the guide lines (S44); deriving a group allocated to a peripheral item corresponding to the derived guide line from the multiple number of the groups (S45); allocating the derived group to the central item (S46); recognizing the group allocated to the central item as a group selected by the first character selection gesture (S47); recognizing an initial value of the center item allocated to the center item as a group selected by the first character selection gesture (S47) if the first character selection gesture includes a click gesture to the central item (S42); and displaying a sub-keypad corresponding to the recognized group (S48).

Here, like the keypad 20 of FIG. 3, the sub-keypad corresponding to the group selected by the first character selection gesture includes a central item, a multiple number of peripheral items arranged while being spaced from one another around the central item, and a multiple number of guide lines corresponding to the multiple number of the peripheral items.

In the sub-keypad corresponding to the group selected by the first character selection gesture, the multiple number of the peripheral items may display one or more individual characters included in the selected group.

The central item may be allocated for an initial value of a blank or an initial value selected for any one of the one or more individual characters included in the selected group. For example, assuming that the sub-keypad includes three (3) peripheral items, and Group A includes individual characters a, b and c, an initial value selected for the individual character a representing Group A is arranged in the central item, the individual characters b and c are arranged in two (2) of the three (3) peripheral items, and the other one peripheral item may be blank. Or, an initial value of a blank may be arranged in the central item, and the individual characters a, b and c may be differently arranged in the three (3) peripheral items.

Meanwhile, in the displaying of the sub-keypad (S40), the input device 10 may further display the sub-keypad around the main keypad, or display the sub-keypad, instead of the main keypad, after removing the main keypad.

Further, in displaying either the main keypad or the sub-keypad (S20, S40), the input device 10 may display the main keypad or the sub-keypad at a position at least partially overlapping with the character input window. In this case, the central item may be overlapped with an activated cursor within the character input window. In this way, a position, into which a character that a user desires to input will be inserted, can be easily recognized, so that the intuition of the input device 10 can be further improved.

For example, the main keypad in S20 may be displayed around the character input window, and the sub-keypad in S40, after input of the first character selection gesture (S30), may be displayed to include the central item overlapping with the cursor of the character input window. As another example, the main keypad in S20 may be displayed to include the central item overlapping with the cursor of the character input window. When the first character selection gesture is input (S41), the main keypad is removed, and then, the sub-keypad may be displayed at the same position as the main keypad removed in S48.

Subsequently, in the sensing of a second character selection gesture as illustrated in FIG. 5 (S50), in the state that the sub-keypad corresponding to the group selected by the first character selection gesture is displayed, the input device 10 senses a second character selection gesture for selecting any one of items of the sub-keypad. One of one or more individual characters arranged in the sub-keypad is selected, by the second character selection gesture.

The second character selection gesture includes a drag gesture based on a guide line, which corresponds to a peripheral item desired to be selected, among the multiple number of the guide lines included in the sub-keypad, or a click gesture to the central item. That is, a second character selection gesture for selecting any one of one or more individual characters arranged in the multiple number of the peripheral items of the sub-keypad includes a drag gesture matching a form and a direction of a guide line corresponding to a peripheral item, in which the individual character to be selected is arranged. Or, the second character selection gesture for selecting an individual character arranged in the central item of the sub-keypad includes a click gesture to the central item.

Since the second character selection gesture is identical to the above-described first character selection gesture in that they both are intended to select one of the central item and the multiple number of the peripheral items in the keypad of FIG. 3, overlapping descriptions in this regard are omitted hereinafter.

Next, in the inserting of the selected individual character into a character string of the character input window based on the second character selection gesture (S60), the input device 10 recognizes the individual character selected by the second character selection gesture and displays a character string, into which the selected individual character is inserted, in the character input window.

Although not separately illustrated, the recognizing of the individual character selected by the second character selection gesture is identical to the recognizing of the group selected by the first character selection gesture as illustrated in FIG. 7 (S41 to S47), except for using the second character selection gesture instead of the first character selection gesture, selecting an individual character instead of a group, and inserting an individual character selected by the second character selection gesture instead of displaying the sub-keypad (S48). Thus, overlapping descriptions in this regard will be omitted hereinafter.

Subsequently, a character string including one or more individual characters is input into the character input window, by repeating the displaying of the main keypad (S20), the sensing of the first character selection gesture (S30), the displaying of the sub-keypad (S40), the sensing of the second character selection gesture (S50), and the inserting of a selected individual character.

Thereafter, when the inputting of a character string is finished, and a keypad close gesture for removing the keypad is input, the input device 10 finishes the display of the main keypad and the sub-keypad. In this case, the keypad close gesture may include a click gesture to an area other than the character input window, a clock gesture to an area other than the touch input window, or a separate button click.

Next, examples of a process for inputting a Japanese or Korean character string, through the input device and the method for inputting a character by using the input device in accordance with an example embodiment is described with reference to FIG. 8 to FIG. 17G. In the examples, it is assumed that the gesture sensor 12 of the input device 10 includes a touch screen.

Figure 8:
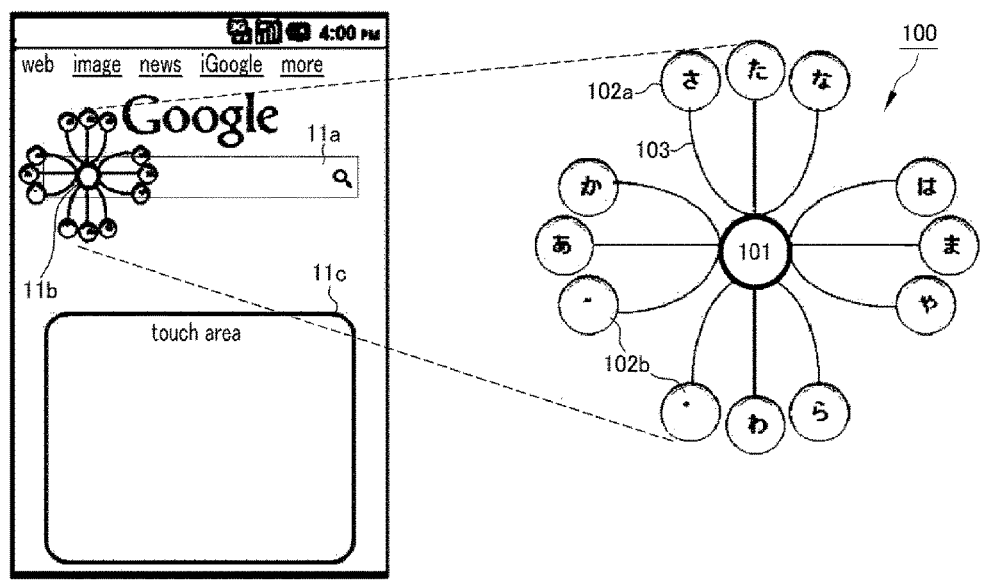
FIG. 8 shows an example of a character input window and a main keypad for inserting Japanese characters, in accordance with an example embodiment.
Figure 9:
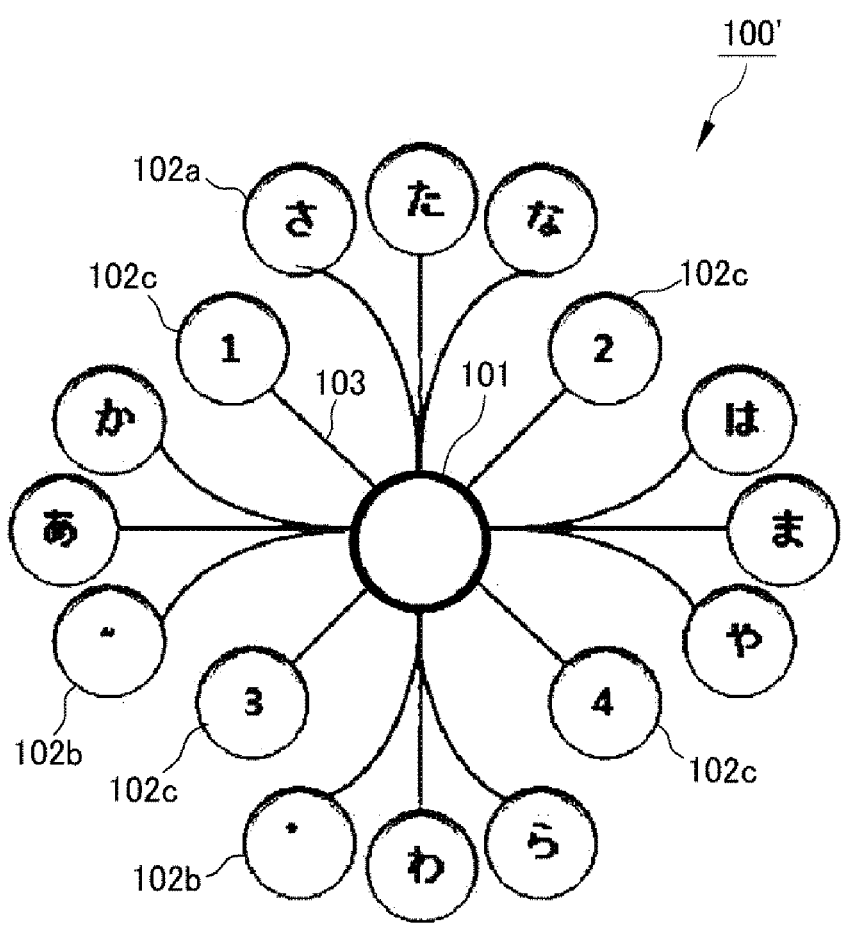
FIG. 9 shows another example for a main keypad for inserting Japanese characters, in accordance with an example embodiment.

First, examples of a process for inputting a Japanese character string is described with reference to FIG. 8 to FIG. 13C. FIG. 8 is an example of a character input window and a main keypad for inputting a Japanese character in accordance with an example embodiment, and FIG. 9 is another example of a main keypad for inputting a Japanese character in accordance with an example embodiment. FIG. 10A to FIG. 10E and FIG. 11A to FIG. 11C are examples of a process for inputting the character "あ" by using the main keypad of FIG. 8. FIG. 12A to FIG. 12E and FIG. 13A to FIG. 13C are examples of a process for inputting the character "ぬ" by using the main keypad of FIG. 8.

As illustrated in FIG. 8, in the state that the display 11 displays a character input window 11a, when a keypad request gesture is sensed (S10), the input device 10 displays a main keypad 100 (S20). For example, the display 11 includes the character input window 11a that displays an input character string, a cursor 11b that indicates a position within the character input window 11a, into which a character string is inserted, and a touch input window 11c that receives input of a gesture and displays the input gesture. The cursor 11b may be activated by a keypad request gesture.

Apart from the character input window 11a, the touch input window 11c is an area touched by a user, i.e., an area where touch is input. However, the embodiment in FIG. 8 is merely illustrative, and the display 11 may not separately include the touch input window 11c, unlike the embodiment illustrated in FIG. 8.

The main keypad 100 may be displayed anywhere of the display 11, but may be displayed at a position adjacent to the character input window 11a, or a position at least partially overlapping with the character input window 11a. Especially, the central item 101 of the main keypad 100 may be displayed at a position overlapping with a cursor 11c of the character input window 11a. If so, a position, into which a character to be inputted by a user will be inserted, can be easily recognized.

The main keypad 100 for inputting a Japanese character is intended to select one of a multiple number of groups, into which the whole hiragana or katakana characters of the Japanese language are classified.

For example, the Japanese language is marked with the hiragana consisting of about fifty (50) individual characters [exactly forty-six (46) individual characters] and the katakana, and voiced sounds and semi-voiced sounds of the hiragana and the katakana. Thus, the individual hiragana and katakana characters may be grouped into five (5) or less individual characters based on vowels and consonants, to be classified into ten (10) groups (10 groups×5).

For example, as illustrated in FIG. 8, if the hiragana is classified into ten (10) groups each including five (5) or less individual characters, ten (10) representative characters representing the ten (10) groups may be determined to be "あ," "か," "さ," "た," "な," "は," "ま," "や," "ら," and "わ." A group corresponding to the representative character "あ" of the ten (10) representative characters may include the individual characters "あ," "い," "う," "え" and "お."

In this case, the main keypad 100 includes a central item 101, a multiple number of peripheral items 102a and 102b, and a multiple number of guide lines 103, wherein ten (10) representative characters ("あ," "か," "さ," "た," "な," "は," "ま," "や," "ら" and "わ") corresponding to the ten (10) groups, into which the hiragana is classified, are differently allocated to the ten (10) peripheral items 102a of the multiple number of the peripheral items 102a and 102b, and a voiced sound mark (") for making a voiced sound and a semi-voiced sound mark (°) for making a semi-voiced sound are allocated to the other two (2) peripheral items 102b, respectively.

Or, as illustrated in FIG. 9, the main keypad 100' may further include peripheral items 102c, to which numeral items are allocated. That is, among the multiple number of the peripheral items 102a, 102b and 102c, the ten (10) peripheral items 102a indicate the ten (10) representative characters ("あ," "か," "さ," "た," "な," "は," "ま," "や," "ら" and "わ"), the two (2) peripheral items 102b indicate the voiced sound mark (") and the semi-voiced sound mark (°) and the other four (4) peripheral items 102c indicate the numerals "1," "2," and "3" of the numeral items "0" to "9."

Figure 10A:
FIG. 10A, FIG. 10B, FIG. 10C, FIG. 10D, FIG. 10E, 10F, FIG. 11A, FIG. 11B, and FIG. 11C show examples of a process for inputting the character "あ" by using the main keypad of FIG. 8.

Next, a process for inputting "あ" and "ぬ" of the hiragana characters by using the main keypad 100 of FIG. 8 is described. First, an example of a process for inputting the Japanese character "あ" is described with reference to FIG. 10A to FIG. 10E. As illustrated in FIG. 10A, in the state that the character input window 11a is displayed, when a user touches a certain point on the touch screen of the gesture sensor 12 or a certain area of the touch input window 11c, the controller 13 recognizes a keypad request gesture including a click gesture in response to the touching sensed through the gesture sensor 12 (S10).

Figure 10B:
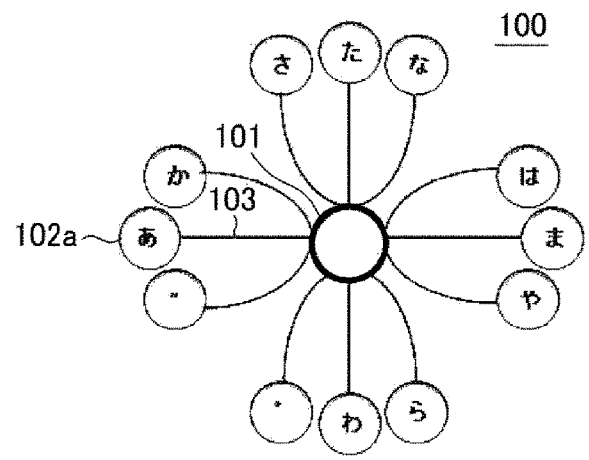

Accordingly, as illustrated in FIG. 10B, the display 11 displays the main keypad 100 (S20). As described above with reference to FIG. 8, the main keypad 100 includes the central item 101, to which an initial value of a blank is allocated, the ten (10) peripheral items 102a, to which the ten (10) representative characters ("あ," "ぬ," "か," "さ," "た," "な," "は," "ま," "や," "ら'" and "わ") representing the hiragana are allocated, the two (2) peripheral items 102b, to which the voiced sound mark (") and the semi-voiced sound mark (°) are allocated, and the twelve (12) guide lines 13 directed from the twelve (12) peripheral items 102a and 102b toward the central item 101. Here, the twelve (12) guide lines 103 have different forms and directions.

Figure 10C:
Figure 10D:
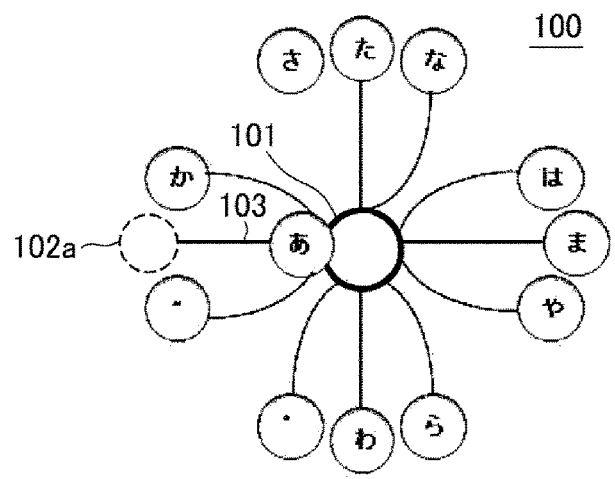

As illustrated in FIG. 10C, in the state that the main keypad 100 is displayed, when a user scratches the touch screen in a straight line form directed from a certain point being touched by the user toward the right side, the controller 13 recognizes a first character selection gesture including a drag gesture in a straight line form directed from the left side toward the right side in response to the scratching sensed through the gesture sensor 12 (S30).

Based on the first character selection gesture, the controller 13 derives the guide line 103 in the straight line form directed from the left side toward the right side (S41 to S44), derives the peripheral item 102a positioned at the left center of the central item 101 along the derived guide line 103, and derives the representative character "あ" allocated to the peripheral item 102a of the left center (S45).

Accordingly, the display 11 positions the derived representative character "あ" in the central item 101 (S46). In this case, the display 11 may display a motion showing that the representative character "あ" moves from the peripheral item 102a of the left center toward the central item 101, like the drag gesture included in the first character selection gesture.

Figure 10E:
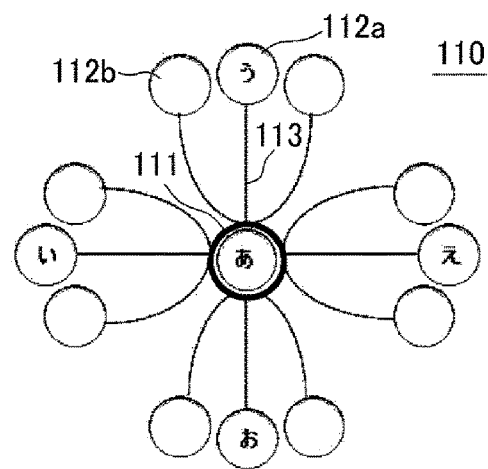

The controller 13 recognizes that the representative character "あ" allocated to the central item 101 and the group corresponding to the representative character "あ" (hereinafter, referred-to as the "あ group") are selected by the first character selection gesture (S47). In addition, as illustrated in FIG. 10E, the display 11 displays the motion showing that the representative character "あ" selected by the first character selection gesture moves to be allocated to the central item 101, and then, displays the sub-keypad 110 corresponding to the あ group (S48).

The sub-keypad 110 corresponding to the あ group includes a central item 111, to which an initial value of "あ" is allocated, four (4) peripheral items 112a, to which among the five (5) individual characters ('あ', 'い', 'う', 'え', 'お') included in the あ group, the characters other than "あ" are allocated, eight (8) peripheral items 112b, which are blank, and twelve (12) guide lines 113 directed from the twelve (12) peripheral items 112a and 112b toward the central item 111.

Figure 10F:

A pointer at the time that the sub-keypad 110 is displayed, i.e., a touch point on the touch screen corresponds to the central item 111. In this state, as illustrated in FIG. 10F, when the user detaches the touch screen, the controller 13 recognizes a second character selection gesture including a click gesture to the central item 111 in response to the detaching sensed through the gesture sensor 12 (S50).

In this case, since the second character selection gesture includes a click gesture to the central item 111, the controller 13 recognizes that the individual character "あ," which is an initial value of the central item 111, is an individual character selected by the second character selection gesture. In addition, the display 11 displays a character string, into which the individual character "あ" selected by the second character selection gesture has been inserted, in the character input window 11*a* (S60). Further, the keypad request gesture and the first and second character selection gestures illustrated in FIG. 10A, FIG. 10B and FIG. 10F may be collective motions.

Figure 11A:
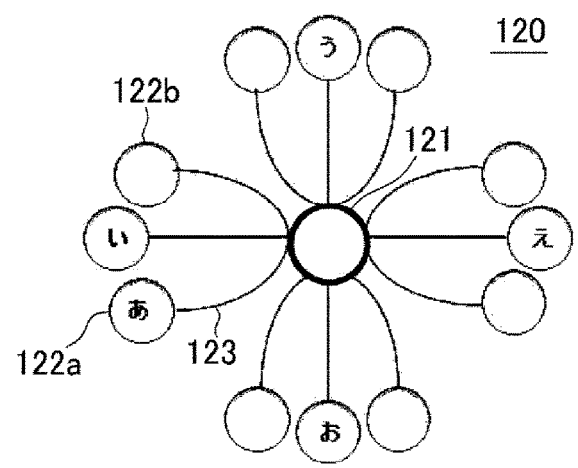

FIG. 10E illustrates that the central item 111 of the sub-keypad 110 corresponding to the あ group is allocated for an initial value selected for the representative character "い," but may be an initial value of a blank. That is, as illustrated in FIG. 11A, the sub-keypad 120 corresponding to the あ group includes a central item 121, to which an initial value of a blank is allocated, five (5) peripheral items 122*a*, to which five (5) individual characters ("あ," "い," "う," "え" and "お") included in the あ group are allocated, seven (7) peripheral items 122*b*, which are blank, and twelve (12) guide lines 123 directed from the twelve (12) peripheral items 122*a* and 122*b* toward the central item 121.

Figure 11B:
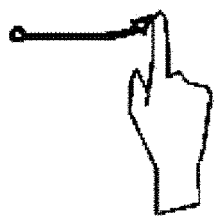

As illustrated in FIG. 11B, in the state that the sub-keypad 120 corresponding to the あ group is displayed, when a user scratches the touch screen in a counterclockwise curved line form directed from the lower left side toward the upper right side, the controller 13 recognizes a second character selection gesture including a drag gesture in a counterclockwise curved line form directed from the lower left side toward the upper right side in response to the scratching sensed through the gesture sensor 12 (S50).

The controller 13 recognizes that the individual character "あ" allocated to the peripheral item 122*a* positioned at the lower left side of the central item 121 is an individual character selected by the second character selection gesture.

Figure 11C:
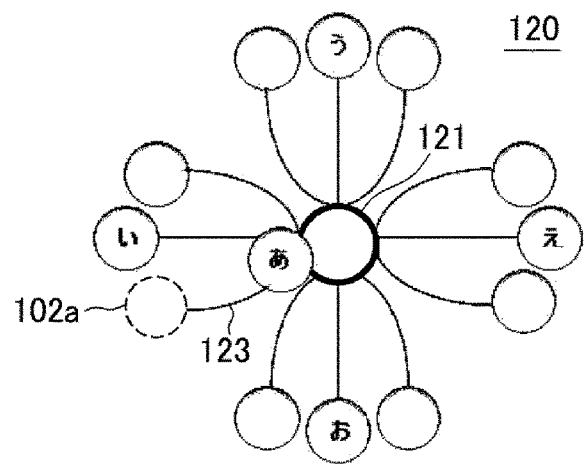

In addition, as illustrated in FIG. 11C, the display 11 displays a motion showing that the individual character "あ" selected by the second character selection gesture moves to be allocated to the central item 121, and then, inserts the individual character "あ" placed at the central item 121 into a character string of the character input window 11*a* (S60).

Next, an example of a process for inputting the Japanese character "ぬ" is described with reference to FIG. 12A to FIG. 12E. Since the processes for inputting the keypad request gesture (S10) and displaying the main keypad 100 are the same as described above with respect to FIG. 10A and FIG. 10B, overlapping descriptions in this regard are omitted.

Figure 12A:
FIG. 12A, 12B, 12C, 12D, FIG. 12E, FIG. 13A, FIG. 13B, and FIG. 13C show examples of a process for inputting the character "ぬ" by using the main keypad of FIG. 8.

As illustrated in FIG. 12A, in the state that the main keypad 100 is displayed (S20), when a user scratches the touch screen in a clockwise curved line form directed from a certain point being touched by the user toward the lower left side, the controller 13 recognizes a first character selection gesture including a drag gesture in a clockwise curved line form directed from the upper right side toward the lower left side in response to the scratching sensed through the gesture sensor 12 (S30).

The controller 13 recognizes that the representative character "な" allocated to the peripheral item 102*a* positioned at the upper right side of the central item 101, and the group corresponding to the representative character "な" (hereinafter, referred-to as the "な group") are selected by the first character selection gesture.

Figure 12B:
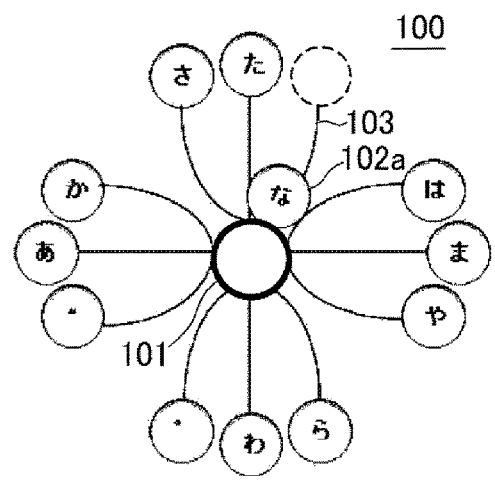
Figure 12C:
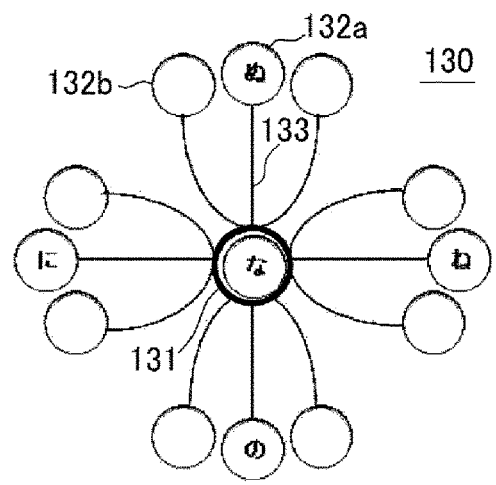

The display 11 displays a motion showing that the representative character "な" selected by the first character selection gesture moves to be allocated to the central item 101 as illustrated in FIG. 12B, and then, displays the sub-keypad 130 corresponding to the な group as illustrated in FIG. 12C (S40).

The sub-keypad 130 corresponding to the な group includes a central item 131 to which an initial value of the representative character "な" is allocated, four (4) peripheral items 132*a* to which among the five (5) individual characters ("な," "に," "ね," "ぬ" and "の") included in the な group the characters other than "な" are allocated, eight (8) peripheral items, which are blank, and twelve (12) guide lines 133 directed from the twelve (12) peripheral items 132*a* and 132*b* toward the central item 131.

Figure 12D:

As illustrated in FIG. 12D, in the state that the sub-keypad 130 corresponding to the な group is displayed, when a user scratches the touch screen in a straight line form directed toward the lower side, the controller 13 senses a second character selection gesture including a drag gesture in a straight line form directed from the upper side toward the lower side in response to the scratching sensed through the gesture sensor 12 (S50). The controller 13 recognizes that the individual character "ぬ" allocated to the peripheral item 132*a* positioned at the upper side of the peripheral item 131 is selected by the second character selection gesture.

Figure 12E:
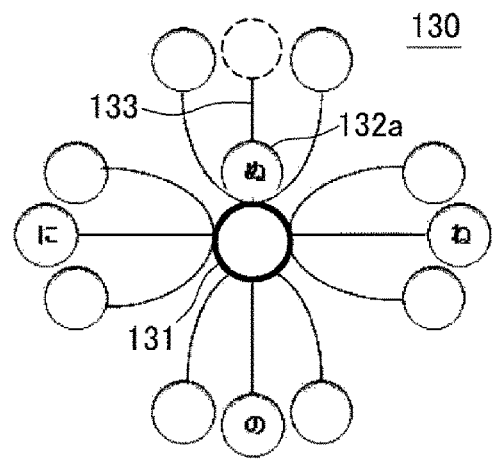

In addition, the display 11 displays a motion showing that the individual character "ぬ" selected by the second character selection gesture moves to be allocated to the central item 131 as illustrated in FIG. 12E, and then, inserts the individual character "ぬ" arranged in the central item 131 into a character string of the character input window 11*a* (S60).

Figure 13A:
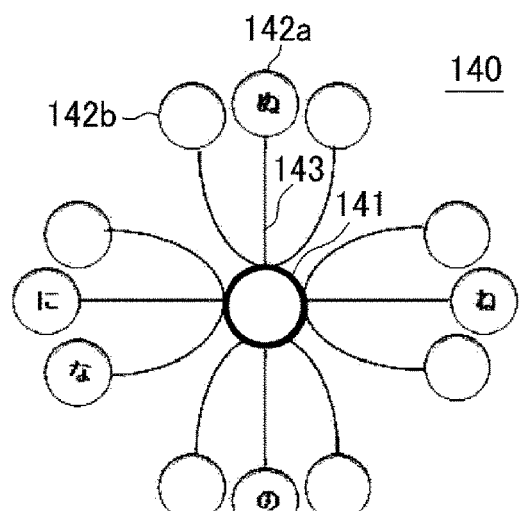

FIG. 12B illustrates that the central item 131 of the sub-keypad 130 corresponding to the な group is allocated for an initial value selected for the representative character "な," but may be an initial value of a blank. That is, as illustrated in FIG. 13A, the sub-keypad 140 corresponding to the ぬ group includes a central item 141, to which an initial value of a blank is allocated, five (5) peripheral items 142*a*, to which the five (5) individual characters ("な," "に," "ぬ," "ね" and "の") included in the ぬ group are allocated, seven (7) peripheral items 142*a* and 142*b*, which are blank, and twelve (12) guide lines 143 directed from the twelve (12) peripheral items 142*a* and 142*b* toward the central item 141.

Figure 13B:

As illustrated in FIG. 13B, in the state that the sub-keypad 140 corresponding to the ぬ group is displayed, when a user scratches the touch screen in a straight line form toward the lower side, the controller 13 recognizes a second character selection gesture including a drag gesture in a straight line form directed from the upper side toward the lower side in response to the scratching sensed by the gesture sensor 12 (S50). The controller 13 recognizes that the individual character "ぬ" allocated to the peripheral item 132*a* positioned at the upper side of the central item 131 is selected by the second character selection gesture.

Figure 13C:
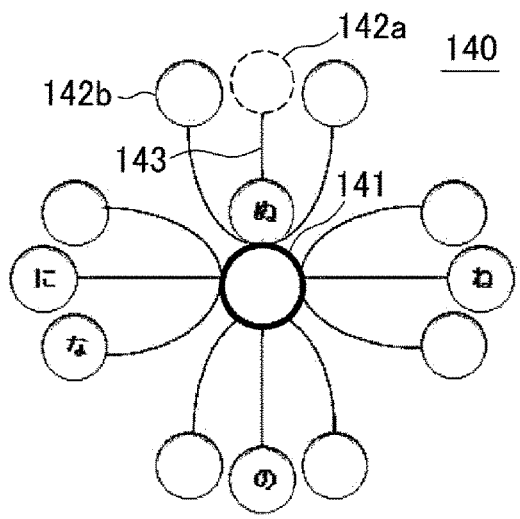

In addition, the display 11 displays a motion showing that the individual character "ぬ" selected by the second character selection gesture moves to be allocated to the central item 131 as illustrated in FIG. 13C, and then, inserts the individual character "ぬ" arranged in the central item 131 into a character string of the character input window 11*a* (S60).

Next, examples of a process for inputting a Korean character string are described with reference to FIG. 14A to FIG. 17G.

Figure 14A:
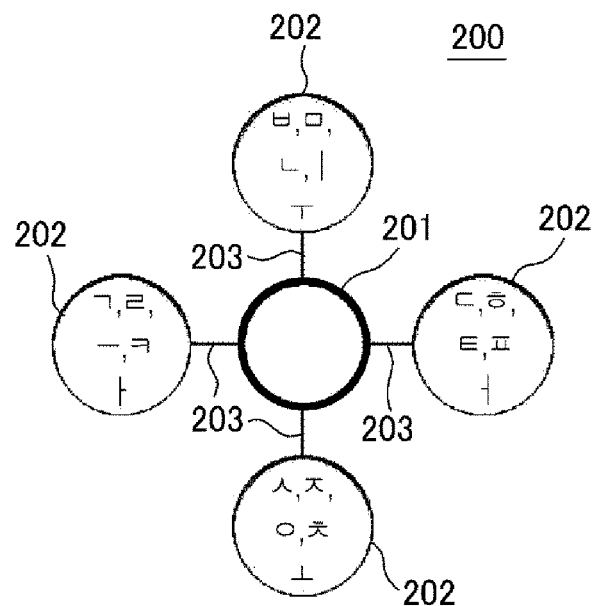
FIG. 14A and FIG. 14B shows an example of a main keypad for inserting Korean characters, in accordance with an example embodiment.
Figure 14B:
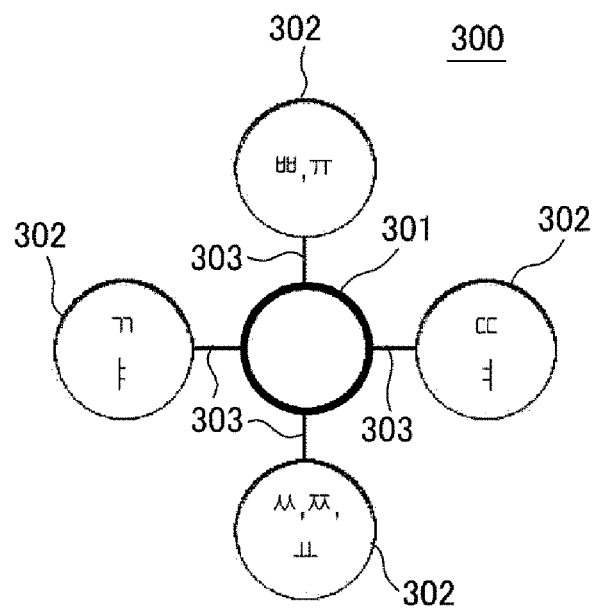

FIG. 14A and FIG. 14B illustrate an example of a main keypad for inserting a Korean character, and FIG. 15A to FIG. 17G are examples for inputting 'ㄱ', 'ㅏ' and 'ㄲ' of the Korean characters by using the main keypad of FIG. 14A to FIG. 14B, in accordance with an example embodiment.

As illustrated in FIG. 14A and FIG. 14B, the main keypad 200 for inputting Korean characters, i.e., Hangeul, is intended to select one of a multiple number of groups, into which consonants and vowels of Hangeul are classified. For example, Hangeul is marked with nineteen (19) consonants and twenty-one (21) vowels, among which the 19 consonants may be divided into fourteen (14) single consonants and five (5) double consonants. Here, the fourteen (14) single consonants are "ㄱ," "ㄷ," "ㄴ," "ㄹ," "ㅁ," "ㅂ," "ㅅ," "ㅈ," "ㅇ," "ㅊ," "ㅋ," "ㅍ," "ㅌ" and "ㅎ," and the five (5) double consonants are "ㄲ," "ㄸ," "ㅃ," "ㅆ" and "ㅉ."

In addition, the twenty-one (21) vowels may be divided into six (6) basic vowels, four (2) primary double vowels, which are combinations of the four (4) basic vowels other than "-," and "l" and the vowel "l," and secondary double vowels, which are combinations of the basic vowels and the first primary double vowels. Here, the six (6) basic vowels are "ㅏ," "ㅓ," "ㅗ," "ㅜ," "-," and "l," and the primary double vowels are "ㅑ," "ㅕ," "ㅛ," and "ㅠ."

The whole individual characters of Hangeul may be divided into eight (8) groups. That is, the fourteen (14) single consonants and the six (6) single vowels may be classified into four (4) groups, according to their forms and pronounce, and the five (5) double consonants and the four (4) primary double vowels may be classified into other four (4) groups.

Specifically, a first group includes the characters "ㄱ," "ㄹ," "ㅋ," "-" and "ㅏ," and a second group includes the characters "ㄴ," "ㅁ," "ㅂ" and "ㅜ." A third group includes the characters "ㄷ," "ㅌ," "ㅍ," "ㅎ" and "ㅓ," and a fourth group includes the characters "ㅇ," "ㅅ," "ㅈ," "ㅊ," and "ㅗ." A fifth group includes the characters "ㄲ" and "ㅑ" and a sixth group includes the characters "ㄸ" and "ㅕ." A seventh group includes the characters "ㅃ" and "ㅠ," and an eighth group includes the characters "ㅆ," "ㅉ" and "ㅛ."

In this case, the first main keypad 200 for selecting single consonants and a second main keypad 300 for selecting double consonants are required. That is, as illustrated in FIG. 14A, the first main keypad 200 includes a central item 201, a multiple number of peripheral items 202, to which first to fourth groups into which the fourteen (14) single consonants and six (6) single vowels are classified are allocated, and a multiple number of guide lines 203 corresponding to the multiple number of the peripheral items 202.

As illustrated in FIG. 14B, the second main keypad 300 includes a central item 301, a multiple number of peripheral items 302, to which fifth to eighth groups into which the five (5) double consonants and the four (4) primary double vowels are classified are allocated, and a multiple number of guide lines 303 corresponding to the multiple number of the peripheral items 302.

Next, FIG. 15A to FIG. 17G show a process for inputting the Korean characters "ㄱ," "ㅏ" and "ㄲ," by using the first and second main keypads 200 and 300 of FIG. 14A and FIG. 14B. First, a process for inputting the Korean character "ㄱ" is described with reference to FIG. 15A to FIG. 15G.

Figure 15A:
Figure 15B:
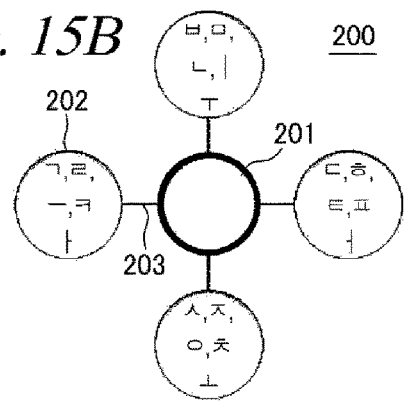

As illustrated in FIG. 15A, in the state that the character input window 11a is displayed, when a user touches a certain point of the touch screen of the gesture sensor 12 or a certain area of the touch input window 11c, the controller 13 recognizes a keypad request gesture including a click gesture in response to the touching sensed through the gesture sensor 12 (S10). Accordingly, as illustrated in FIG. 15B, the display 11 displays the first main keypad 200 (S21).

As described above with respect to FIG. 14A, the first main keypad 200 includes a central item 201, to which an initial value of a blank is allocated, four (4) peripheral items 202, to which first to fourth groups into which the single consonants and the single vowels of Hangeul are classified are allocated, and four (4) guide lines 203, which are mutually different paths directed toward the central item 201 and correspond to the four (4) peripheral items 202.

Figure 15C:

As illustrated in FIG. 15C, in the state that the first main keypad 200 is displayed, when a user scratches the touch screen in a straight line form directed from a certain point being touched by the user toward the right side, the controller 13 recognizes a first character selection gesture including a drag gesture in a straight line form directed from the left side toward the right side in response to the scratching sensed through the gesture sensor 12 (S30). The controller 13 recognizes that the first group ("ㄱ," "ㄹ," "ㅋ," "-" and "ㅏ") allocated to the peripheral item 202 positioned at the left side of the central item 201 is selected by the first character selection gesture.

Figure 15D:
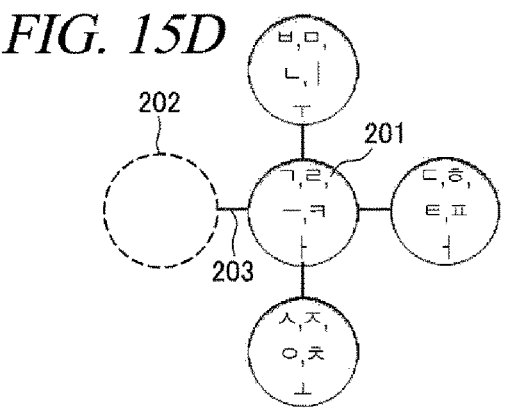
Figure 15E:
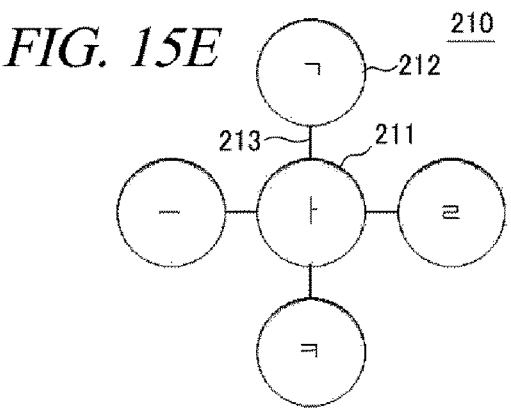

Accordingly, the display 11 displays a motion showing that the first group ("ㄱ," "ㄹ," "ㅋ," "-" and "ㅏ") selected by the first character selection gesture moves to be allocated to the central item 201 as illustrated in FIG. 15D, and then, displays a sub-keypad 210 corresponding to the first group ("ㄱ," "ㄹ," "ㅋ," "-" and "ㅏ") arranged in the central item 201 as illustrated in FIG. 15E (S40).

The sub-keypad 210 corresponding to the first group ("ㄱ," "ㄹ," "ㅋ," "-" and "ㅏ") includes a central item 211 to which an initial value of the character "ㅏ" representing the first group ("ㄱ," "ㄹ," "ㅋ," "-" and "ㅏ") is allocated, four (4) peripheral items 212 to which among the first group ("ㄱ," "ㄹ," "ㅋ," "-" and "ㅏ") the characters "ㄱ," "ㄹ," "ㅋ" and "-" other than the character "ㅏ" are allocated, and four (4) guide lines 213, which are mutually different paths directed from the four (4) peripheral items 212 toward the central item 211.

Figure 15F:

As illustrated in FIG. 15F, in the state that the sub-keypad 210 corresponding to the first group ("ㄱ," "ㄹ," "ㅋ," "-" and "ㅏ") is displayed, when a user scratches the touch screen in a straight line form directed toward the lower side, the controller 13 recognizes a second character selection gesture including a drag gesture in a straight line form directed from the upper side toward the lower side in response to the scratching sensed through the gesture sensor 12 (S50).

The controller 13 recognizes that the individual character "ㄱ" allocated to the peripheral item 212 positioned at the upper portion of the central item 211 is selected by the second character selection gesture.

Figure 15G:
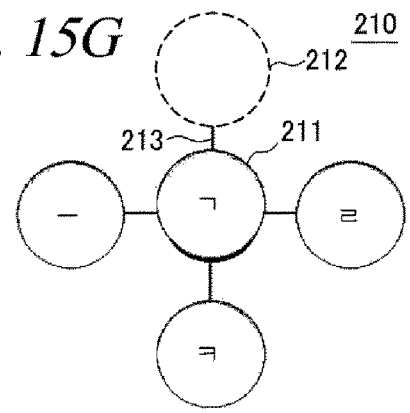

In addition, the display 11 displays a motion showing that the individual character "ㄱ" selected by the second character selection gesture moves to be allocated to the central item 211 as illustrated in FIG. 15G, and then, inserts the individual character "ㄱ" arranged in the central item 211 into a character string of the character input window 11a (S60).

Next, an example of a process for inputting the Korean character "ㅏ" is described with reference to FIG. 16A to FIG. 16D. Since the processes for inputting the keypad request gesture (S10) and displaying the main keypad 100 are the same as described above with respect to FIG. 15A and FIG. 15B, overlapping descriptions in this regard are omitted.

As illustrated in FIG. 16A, in the state that the first main keypad 200 is displayed, when a user scratches the touch screen in a straight line form directed from a certain point being touched by the user toward the left side, the controller 13 recognizes a first character selection gesture including a drag gesture in a straight line form directed from the right side toward the left side in response to the scratching sensed through the gesture sensor 12 (S30). The controller 13 recognizes that the third group ("ㄷ," "ㅌ," "ㅍ," "ㅎ" and "ㅓ") allocated to the peripheral item 202 positioned at the right side of the central item 101 is selected by the first character selection gesture.

Accordingly, the display 11 displays a motion showing that the third group ("ㄷ," "ㅌ," "ㅍ," "ㅎ" and "ㅓ") selected by the first character selection gesture moves to be allocated to the central item 201 as illustrated in FIG. 16B, and then, displays a sub-keypad 220 corresponding to the third group ("ㄷ," "ㅌ," "ㅍ," "ㅎ" and "ㅓ") arranged in the central item 201 (S40) as illustrated in FIG. 16C.

The sub-keypad 220 corresponding to the third group ("ㄷ," "ㅌ," "ㅍ," "ㅎ" and "ㅓ") includes a central item 221, to which an initial value of the character "ㅓ" representing the third group ("ㄷ," "ㅌ," "ㅍ," "ㅎ" and "ㅓ") is allocated, four (4) peripheral items 222, to which among the third group ("ㄷ," "ㅌ," "ㅍ," "ㅎ" and "ㅓ"), the characters "ㄷ," "ㅌ," "ㅍ" and "ㅎ" other than the character "ㅓ" are allocated, and four (4) guide lines 223, which are mutually different paths directed from the four (4) peripheral items 222 toward the central item 221.

A pointer at the time that the sub-keypad 220 is displayed, i.e., a touching point on the touch screen corresponds to the central item 221. In this state, as illustrated in FIG. 16D, when the user detaches the touch screen, the controller 13 recognizes a second character selection gesture including a click gesture to the central item 221 in response to the detaching sensed through the gesture sensor 12 (S50).

The controller 13 recognizes that the individual character "ㅓ" allocated to the central item 221 is selected by the second character selection gesture. In addition, the display 11 inserts the individual character "ㅓ" selected by the second character selection gesture into a character string of the character input window 11a (S60).

Next, an example of a process for inputting the Korean character "ㄷㅏ" is described with reference to FIG. 17A to FIG. 17G. Since the processes for inputting the keypad request gesture (S10) and displaying the main keypad 100 (S20) are the same as described above with respect to FIG. 15A and FIG. 15B, overlapping descriptions in this regard are omitted.

Figure 17A:
Figure 17B:
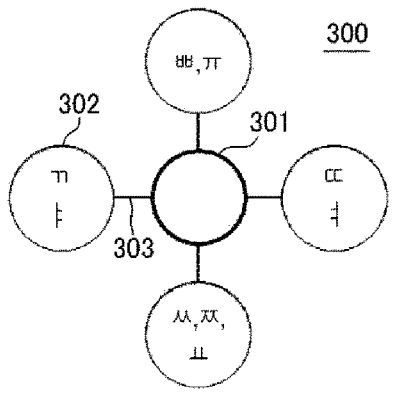

As illustrated in FIG. 17A, in the state that the first main keypad is displayed, when a user double-touches an area corresponding to the character input window 11a or a certain area of the touch input window 11c, the controller 13 recognizes a keypad change gesture in response to the double-touching sensed through the gesture sensor 12 (S22). Accordingly, the display 11 displays the second main keypad 300 as illustrated in FIG. 17B (S23).

As described above with respect to FIG. 14B, the second main keypad 300 includes a central item 301 to which an initial value of a blank is allocated, four (4) peripheral items 302 to which the fifth to eighth groups into which the single consonants and the single vowels of Hangeul are classified are allocated, and four (4) guide lines, which are mutually different paths directed toward the central item 301 and correspond to the four (4) peripheral items 302.

Figure 17C:

As illustrated in FIG. 17C, in the state that the second main keypad 300 is displayed (S23), when a user scratches the touch screen in a straight line form directed from a certain point being touched by the user toward the right side, the controller 13 recognizes a first character selection gesture including a drag gesture in a straight line form directed from the left side toward the right side in response to the scratching sensed by the gesture sensor 12 (S30).

Figure 17D:
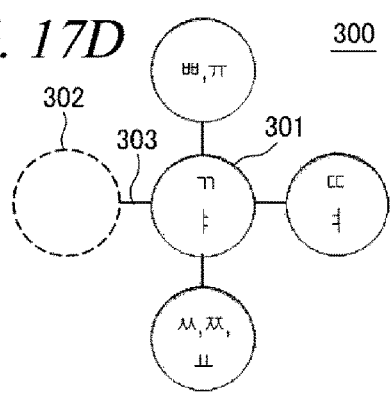
Figure 17E:
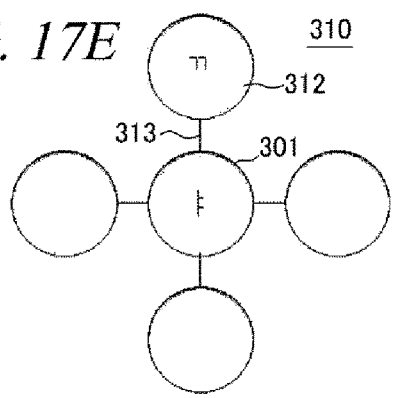

The controller 13 recognizes that the fifth group ("ㄷㄱ" and "ㅏ") allocated to the peripheral item 302 positioned at the left side of the central item 301 is selected by the first character selection gesture. Accordingly, the display 11 displays a motion showing that the fifth group ("ㄷㄱ" and "ㅏ") selected by the first character selection gesture moves to be allocated to the central item 301 as illustrated in FIG. 17D, and then, displays the sub-keypad 310 corresponding to the fifth group ("ㄷㄱ" and "ㅏ") arranged in the central item 301 as illustrated in FIG. 17E (S40).

The sub-keypad 310 corresponding to the fifth group ("ㄷㄱ" and "ㅏ") includes a central item 311, to which an initial value of the character "ㅏ" representing the fifth group ("ㄷㄱ" and "ㅏ") is allocated, one (1) peripheral items 312a, to which among the fifth group ("ㄷㄱ" and "ㅏ"), the character "ㄷㄱ" other than the character "ㅏ" is allocated, three (3) peripheral items 312b, which are blank, and four (4) guide lines 313, which are mutually different paths directed from the peripheral items 312a and 312b toward the central item 311.

Figure 17F:

As illustrated in FIG. 17F, in the state that the sub-keypad 310 corresponding to the fifth group ("ㄷㄱ" and "ㅏ") is displayed (S40), when a user scratches the touch screen in a straight line form directed toward the lower side, the controller 13 recognizes a second character selection gesture including a drag gesture in a straight line form directed toward the upper side toward the lower side in response to the scratching sensed through the gesture sensor 12 (S50). The controller 13 recognizes that the individual character "ㄷㄱ" allocated to the peripheral item 312 positioned at the upper portion of the central item 311 is selected by the second character selection gesture.

Figure 17G:
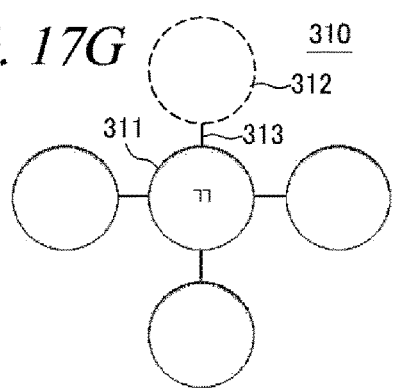

In addition, the display 11 displays a motion showing that the individual character "ㄷㄱ" selected by the second character selection gesture moves to be allocated to the central item 311 as illustrated in FIG. 17G, and then, inserts the individual character "ㄷㄱ" arranged in the central item 311 into a character string of the character input window 11a (S60).

Table 1 below provides gestures for inputting the Korean characters in the state that the character entering window is displayed, by using the first and second main keypads 200, 300 of FIG. 14A to FIG. 14B. In Table 1 below, T-O and T-F refer to touching and detaching, respectively, D-U, D-D, D-L, and D-R refer to drag gestures directed toward upper, lower, left and right sides, and TT-O refers to double-touching (matching a double click).

TABLE 1

| Korean Characters | Gestures |
| --- | --- |
| ㄱ | T-O, D-R, D-D, T-F |
| ㄴ | T-O, D-D, D-R, T-F |
| ㄷ | T-O, D-L, D-R, T-F |
| ㄹ | T-O, D-R, D-L, T-F |
| ㅁ | T-O, D-D, D-L, T-F |

TABLE 1-continued

| Korean Characters | Gestures |
|---|---|
| ㅂ | T-O, D-D, D-U, T-F |
| ㅅ | T-O, D-U, D-D, T-F |
| ㅇ | T-O, D-U, D-L, T-F |
| ㅈ | T-O, D-U, D-R, T-F |
| ㅊ | T-O, D-U, D-U, T-F |
| ㅌ | T-O, D-L, D-D, T-F |
| ㅍ | T-O, D-L, D-L, T-F |
| ㅋ | T-O, D-R, D-U, T-F |
| ㅎ | T-O, D-L, D-U, T-F |
| ㄲ | TT-O, D-R, D-D, T-F |
| ㄸ | TT-O, D-L, D-R, T-F |
| ㅃ | TT-O, D-D, D-U, T-F |
| ㅆ | TT-O, D-U, D-D, T-F |
| ㅉ | TT-O, D-U, D-R, T-F |
| ㅏ | T-O, D-R, T-F |
| ㅓ | T-O, D-L, T-F |
| ㅗ | T-O, D-U, T-F |
| ㅜ | T-O, D-D, T-F |
| ㅡ | T-O, D-R, D-R, T-F |
| ㅣ | T-O, D-D, D-D, T-F |
| ㅑ | TT-O, D-R, T-F |
| ㅕ | TT-O, D-L, T-F |
| ㅛ | TT-O, D-U, T-F |
| ㅠ | TT-O, D-D, T-F |
| <space> | T-O, T-F |
| <bs> | TT-O, T-F |

Figure 1B:
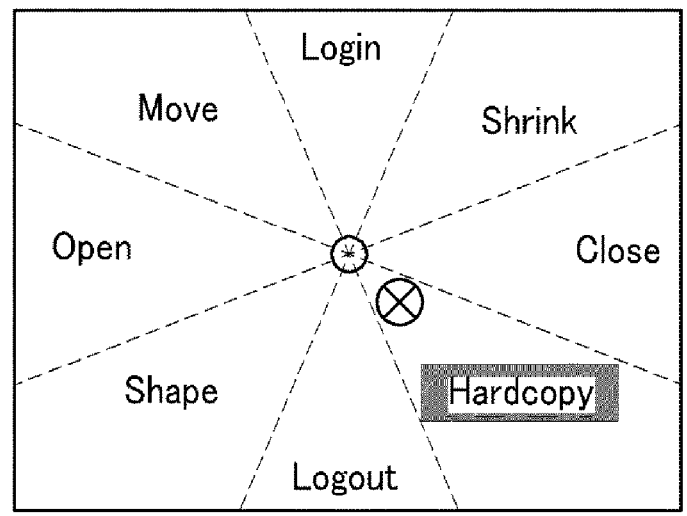
FIG. 1B shows an example of a circular menu.

For reference, the components illustrated in FIG. 1 may imply software or hardware such as a field programmable gate array (FPGA) or an application specific integrated circuit (ASIC), and carry out predetermined functions. However, the "components" are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions thereof can be combined with each other or can be divided.

The example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the example embodiments have been described in relation to the certain examples. However, the components or parts or all the operations of the method and the system may be embodied using a computer system having universally used hardware architecture.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

I claim:

1. An input device for providing a character input interface, comprising:
   a display that displays a keypad for input of a character, and a character input window showing a character string input through the keypad;
   a gesture sensor that senses a gesture of a user; and a controller that controls the display, based on the gesture,
   wherein the keypad comprises:
      a central item;
      a plurality of peripheral items arranged while being spaced from one another around the central item; and
      a plurality of guide lines corresponding to the plurality of the peripheral items,
      wherein the plurality of the guide lines are in a straight or curved line form directed from each of the plurality of the peripheral items toward the central item, and have different forms and directions,
   wherein when a character selection gesture for selecting any one item of the keypad is input through the gesture sensor, the display inserts an individual character allocated to the item selected by the character selection gesture into a character string of the character input window,
   wherein the character selection gesture comprises a drag gesture based on one of the plurality of the guide lines corresponding to a peripheral item or a click gesture corresponding to the central item, and
   in response to a determination that the character selection gesture does not include the click gesture, the controller derives a form and a direction of the drag gesture included in the character selection gesture, derives one of the plurality of the guide lines, which matches the derived form and direction of the drag gesture, and recognizes a derived peripheral item corresponding to the derived guide line as the item selected by the character selection gesture,
   in response to a determination that the character selection gesture does include the click gesture, the controller recognizes an initial value of the central item as an item selected by the character selection gesture.

2. The input device of claim 1, wherein if the character selection gesture includes the drag gesture, the display displays a motion to move an individual character allocated to the peripheral item corresponding to the derived guide line toward the central item.

3. The input device of claim 1,
   wherein if the gesture sensor senses a keypad request gesture for requesting display of the keypad, the display displays a main keypad for selecting any one of a plurality of groups, into which whole individual characters are classified, when the gesture sensor senses a first character selection gesture for selecting any one of the plurality of the groups displayed by the main keypad, the display displays a sub-keypad for selecting any one of one or more individual characters included in the selected group in response to the selected group, when the gesture sensor senses a second character selection gesture for selecting any one of one or more individual characters displayed by the sub-keypad, the display inserts an individual character selected by the second character selection gesture into a character string of the character input window.

4. The input device of claim 1,
wherein the display further displays a cursor indicating a position, into which the character string will be inserted, within the character input window, and
the central item is displayed at a position overlapping with the cursor.

5. The input device of claim 1, wherein the gesture sensor comprises at least one of:
a touch screen that senses a position touched by a user's gesture,
a camera that photographs the user's gesture to generate an image signal,
a motion sensor that outputs a sensor signal corresponding to the user's gesture or posture, and
a current measuring device that measures induced currents by the user's hand,
wherein the induced currents measured by the current measuring device vary depending on types of the user's gestures.

6. A method for inputting a character by using an input device for providing a character input interface, comprising:
displaying a keypad for inputting a character into a character input window showing an input character string;
sensing a character selection gesture for selecting any one item of the keypad; and
inserting an individual character allocated to an item selected by the character selection gesture into a character string of the character input window,
wherein the keypad comprises, a central item, a plurality of peripheral items arranged while being spaced from one another around the central item; and a plurality of guide lines corresponding to the plurality of the peripheral items,
the plurality of the guide lines are in a straight or curved line form directed from each of the plurality of the peripheral items toward the central item, and have different forms and directions, and
the character selection gesture comprises a drag gesture based on one of the plurality of guide lines corresponding to a peripheral item or a click gesture corresponding to the central item, and
the inserting of the individual character into the character string of the character input window comprises:
receiving input of the character selection gesture;
deriving a form and a direction of the drag gesture included in the character selection gesture if the character selection gesture does not include the click gesture;
deriving one of the plurality of the guide lines, which matches the derived form and direction of the drag gesture;
deriving one of the plurality of the peripheral items, which corresponds to the derived guide line, and recognizing the derived peripheral item as an item selected by the character selection gesture;
recognizing an initial value of the central item as an item selected by the character selection gesture if the character selection gesture includes the click gesture; and
inserting the individual character allocated to the selected item into the character string of the character input window,
wherein the recognizing of the derived peripheral item further comprises displaying a motion to move an individual character allocated to the derived peripheral item corresponding to the derived guide line toward the central item.

7. The method for inputting a character of claim 6,
wherein the displaying of the keypad comprises: displaying a main keypad for selecting any one of a plurality of groups, into which whole individual characters are classified, based on a keypad request gesture for requesting display of the keypad, and
the receiving of the input of the character selection gesture comprises: sensing a first character selection gesture for selecting any one of the plurality of the groups displayed by the main keypad; displaying, in response to the group selected by the first character selection gesture, a sub-keypad for selecting any one of one or more individual characters included in the selected group; and sensing a second character selection gesture for selecting any one of one or more individual characters displayed by the sub-keypad, and the inserting of the individual character into the character string of the character input window comprises inserting an individual character selected by the second character gesture into the character string of the character input window.

8. The method for inputting a character of claim 6, wherein in the displaying of the keypad, a cursor indicating a position, into which the character string will be inserted, within the character input window is displayed, and the central item is displayed at a position overlapping with the cursor.

9. The method for inputting a character of claim 6, wherein the character selection gesture is input through at least one of a touch screen that senses a position touched by a user's gesture, a camera that photographs the user's gesture to generate an image signal, a motion sensor that outputs a sensor signal corresponding to the user's gesture or posture, and a current measuring device that measures induced currents by the user's hand, and the induced currents measured by the current measuring device vary depending on types of the user's gestures.

10. A device for inputting a character, comprising:
a gesture sensor that senses a user's gesture corresponding to a keypad of a character input interface displayed in a display device; and
a controller that generates a control signal for controlling the display device based on the gesture to transmit the control signal to the display device, wherein
the keypad comprises a central item and a plurality of peripheral items arranged while being spaced from one another around the central item,
the central item is displayed at a position overlapping with a cursor displayed in a character input window of the character input interface, and when a character selection gesture for selecting any one of the central item and the plurality of the peripheral items is input, the controller generates a control signal corresponding to the selected item, the keypad further comprises:
- a plurality of guide lines, which are paths in a straight or curved line form connecting each of the plurality of the peripheral items and the central item, and have different forms and directions, the character selection gesture comprises a drag gesture based on a guide line corresponding to a peripheral item selected by the user from the plurality of the peripheral items, or a click gesture corresponding to the central item, in response to a determination that the character selection gesture does not include the click gesture, the controller derives, the controller derives a form and a direction of the drag gesture included in the character selection gesture, derives one of the plurality of the guide lines, which matches the derived form and direction of the drag gesture, and derives the peripheral item corresponding to the derived guide line as an item selected by the character selection gesture, and in response to a determination that the character selection gesture does not include the click gesture, the controller derives an initial value of the central item as an item selected by the character selection gesture.

11. The input device of claim 10, wherein the gesture sensor comprises at least one of:
- a touch screen that senses a position touched by a user's gesture,
- a camera that photographs the user's gesture to generate an image signal,
- a motion sensor that outputs a sensor signal corresponding to the user's gesture or posture, and
- a current measuring device that measures induced currents by the user's hand, wherein the induced currents measured by the current measuring device vary depending on types of the user's gesture.

12. The input device of claim 10, wherein if the input character selection gesture includes the drag gesture, the controller derives a form and a direction of the drag gesture included in the character selection gesture, and generates a control signal for controlling the display device to display a motion to move a peripheral item corresponding to the derived guide line toward the central item.

* * * * *